United States Patent
Tsuda et al.

(10) Patent No.: US 8,942,879 B2
(45) Date of Patent: Jan. 27, 2015

(54) HYBRID DRIVE DEVICE

(71) Applicant: Aisin Aw Co., Ltd., Anjo-shi, Aichi (JP)

(72) Inventors: Kohei Tsuda, Nishio (JP); Yoichi Tajima, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 0 days.

(21) Appl. No.: 14/359,211

(22) PCT Filed: Jan. 25, 2013

(86) PCT No.: PCT/JP2013/051617
§ 371 (c)(1),
(2) Date: May 19, 2014

(87) PCT Pub. No.: WO2013/111866
PCT Pub. Date: Aug. 1, 2013

(65) Prior Publication Data
US 2014/0303825 A1    Oct. 9, 2014

(30) Foreign Application Priority Data
Jan. 27, 2012    (JP) .................... 2012-015992

(51) Int. Cl.
*B60W 20/00*    (2006.01)
*B60K 6/48*    (2007.10)
(Continued)

(52) U.S. Cl.
CPC ................. *B60W 20/30* (2013.01); *B60K 6/48* (2013.01); *B60K 6/547* (2013.01); *B60L 11/14* (2013.01);
(Continued)

(58) Field of Classification Search
CPC ..... B60W 10/06; B60W 10/08; B60W 10/11; B60W 20/00; B60W 30/19; B60W 2510/1015; B60W 2710/0666; B60W 2710/083; B60W 2710/1011; B60W 2710/1022; B60K 6/48; F02D 29/02; F02D 2041/141; F02D 41/1498; F16H 63/502; F16H 61/0437; Y02T 10/6221; Y02T 10/6286

USPC .......... 701/22, 51; 180/65.21, 65.225, 65.23, 180/65.265, 65.275, 65.285; 903/902, 906, 903/915, 919
See application file for complete search history.

(56) References Cited

U.S. PATENT DOCUMENTS 6,231,479 B1 *  5/2001  Kraska et al. ................. 477/143
7,909,728 B2 *  3/2011  Tabata et al. ..................... 477/3
(Continued)

FOREIGN PATENT DOCUMENTS

JP    A-9-331603    12/1997
JP    A-2002-271912    9/2002
(Continued)

OTHER PUBLICATIONS

International Search Report issued in International Application No. PCT/JP2013/051617 dated Feb. 19, 2013 (with translation).

*Primary Examiner* — Thomas G Black
*Assistant Examiner* — Ce Li
(74) *Attorney, Agent, or Firm* — Oliff PLC

(57) ABSTRACT

A hybrid drive device having an input member drivingly coupled to an internal combustion engine. Control is performed so that motor torque output by the motor produces at least a part of inertia torque needed for rotation change of input-related members during the shifting. The control device limits the motor torque in an inertia phase during the shifting to a set value that has been set to or below a value having a smaller absolute value between values of performance limit torque of the motor at times before and after the shifting, sets a target input rotational speed of the input member during the shifting, and controls the engagement state of the friction engagement elements that control the rotation change of the input-related members in the inertia phase so as to generate the inertia torque calculated from the target input rotational speed in the input-related members.

6 Claims, 12 Drawing Sheets

(51) Int. Cl.
*B60K 6/547* (2007.10)
*B60L 11/14* (2006.01)
*B60W 10/02* (2006.01)
*B60W 10/08* (2006.01)
*B60W 10/10* (2012.01)
*F16H 59/42* (2006.01)
*F16H 61/02* (2006.01)
*F16H 63/50* (2006.01)
*B60W 10/115* (2012.01)
*B60W 30/19* (2012.01)

(52) U.S. Cl.
CPC ............... *B60W 10/02* (2013.01); *B60W 10/08* (2013.01); *B60W 10/10* (2013.01); *B60W 20/00* (2013.01); *F16H 59/42* (2013.01); *F16H 61/02* (2013.01); *F16H 63/50* (2013.01); *B60W 10/115* (2013.01); *B60W 30/19* (2013.01); *Y02T 10/6221* (2013.01); *B60L 2240/421* (2013.01); *B60L 2240/423* (2013.01); *B60L 2250/28* (2013.01); *B60L 2270/142* (2013.01); *B60L 2270/145* (2013.01); *Y02T 10/7077* (2013.01); *Y02T 10/642* (2013.01); *Y10S 903/93* (2013.01); *Y10S 903/915* (2013.01)
USPC ......... 701/22; 180/65.265; 903/915; 903/930

(56) References Cited

U.S. PATENT DOCUMENTS

| | | | |
|---|---|---|---|
| 8,036,801 B2* | 10/2011 | Tabata et al. | 701/55 |
| 2006/0196711 A1* | 9/2006 | Endo | 180/65.3 |
| 2006/0258506 A1* | 11/2006 | Ibamoto et al. | 477/5 |
| 2008/0196955 A1* | 8/2008 | Minamikawa | 180/65.2 |
| 2009/0227409 A1* | 9/2009 | Ito et al. | 475/5 |
| 2009/0312142 A1* | 12/2009 | Minamikawa | 477/5 |
| 2009/0319141 A1* | 12/2009 | Suzuki et al. | 701/58 |
| 2010/0197452 A1* | 8/2010 | Kaltenbach et al. | 477/14 |
| 2010/0210410 A1* | 8/2010 | Kaltenbach et al. | 477/3 |
| 2010/0274427 A1* | 10/2010 | Ebuchi et al. | 701/22 |
| 2011/0093147 A1* | 4/2011 | Kaltenbach et al. | 701/22 |
| 2011/0184612 A1* | 7/2011 | Fujii et al. | 701/54 |
| 2011/0220428 A1* | 9/2011 | Ando | 180/65.245 |
| 2011/0239801 A1* | 10/2011 | Inagaki et al. | 74/473.1 |
| 2011/0245034 A1* | 10/2011 | Yoshida et al. | 477/8 |
| 2012/0059542 A1* | 3/2012 | Kawai et al. | 701/22 |
| 2012/0078456 A1* | 3/2012 | Hakumura et al. | 701/22 |
| 2012/0290163 A1* | 11/2012 | Inagaki et al. | 701/22 |
| 2012/0316738 A1* | 12/2012 | Teslak et al. | 701/53 |

FOREIGN PATENT DOCUMENTS

| | | |
|---|---|---|
| JP | A-2004-316831 | 11/2004 |
| JP | A-2011-213211 | 10/2011 |

* cited by examiner

FIG. 2

|   | C1 | C2 | C3 | B1 | B2 | F1 | K0 |
|---|----|----|----|----|----|----|----|
| P |    |    |    |    |    |    | ((O)) |
| Rev |  |    | O  |    | O  |    | ((O)) |
| N |    |    |    |    |    |    | ((O)) |
| 1st | O |  |    |    | (O) | O | ((O)) |
| 2nd | O |  |    | O  |    |    | ((O)) |
| 3rd | O |  | O  |    |    |    | ((O)) |
| 4th | O | O |   |    |    |    | ((O)) |
| 5th |   | O | O |    |    |    | ((O)) |
| 6th |   | O |   | O  |    |    | ((O)) |

O ENGAGED
(O) ENGINE BRAKE IN OPERATION
((O)) HYBRID DRIVING STATE (INCLUDING SLIP STATE)

HYBRID DRIVE DEVICE

TECHNICAL FIELD

The present invention relates to a hybrid drive device mounted on, for example, a vehicle, and particularly to a hybrid drive device that is provided in a structure for shifting speed of rotation of an input member drivingly coupled to an internal combustion engine and a motor by using a stepped speed change mechanism and that generates at least a part of inertia torque during the shifting from motor torque.

BACKGROUND ART

In recent years, development is underway on hybrid vehicles that combine an internal combustion engine with a motor-generator (hereinafter simply called "motor") as a source of power. As a configuration of a hybrid drive device used in such a hybrid vehicle, what is called a parallel (one-motor stepped speed change) hybrid drive device is proposed that is structured to include a motor drivingly coupled to an input shaft (input member) drivingly coupled to an internal combustion engine and a stepped speed change mechanism that changes speed of rotation of the input shaft in a stepped manner (refer to Patent Document 1).

Patent Document 1 proposes to perform shift control in the parallel hybrid drive device having the stepped speed change mechanism so as to make the rotational speed of the input shaft coincide with a set target rotational speed while making the motor generate inertia torque of input-related members (members drivingly coupled to the input shaft) required during the shifting in the stepped speed change mechanism.

RELATED ART DOCUMENT

Patent Document

Patent Document 1: Japanese Patent Application Publication No. 2004-316831 (JP 2004-316831 A)

SUMMARY OF THE INVENTION

Problems to be Solved by the Invention

While the shift control of Patent Document 1 is configured to make the motor generate the inertia torque during the shifting, the output torque performance of the motor changes with the rotational speed, so that the motor torque changes during the shifting, causing the following problem. Dealing with the torque change using friction engagement elements in an engagement state (slip state) produces an insufficient response, thus causing a change in a gradient of change in the input rotational speed during the shifting, or causing the output torque to change at a downward gradient despite being in an acceleration state (in which an increase in driving force is required).

A description will be made below on a case of a power-on downshift while the vehicle is traveling using the internal combustion engine, as an example of conventional control, based on FIG. 12. As shown in FIG. 12, when actual shifting starts at a time to after a shift determination, release-side friction element torque TA is reduced (the engagement state of friction engagement elements [clutches and brakes] on a release side is released to be the slip state) so as to increase an input rotational speed NM (i.e., a rotational speed of the input-related members) because the downshift is performed, and, for generating total inertia torque of the input-related members from motor torque Tmg, the motor torque Tmg is output at a level of maximum motor torque Tmg-max that is torque at the limit of the motor performance.

However, the motor speed increases as the input rotational speed Nin increases, so that the maximum motor torque Tmg-max (motor performance limit) decreases, thereby causing the motor torque Tmg in an inertia torque to change at a downward gradient as indicated by an arrow X. This reduces input torque Tin that is a sum of engine torque Te and the motor torque Tmg, so that the release-side friction element torque TA also changes at a downward gradient as indicated by an arrow Y. In other words, the engagement state of the friction engagement elements on the release side is further shifted toward the release side, thus reducing torque transmitted to an output side (wheel side) so as to generate the inertia torque required by the input-related members. This makes output torque Tout also change at a downward gradient, and thus causes the following problem. Despite being in the power-on downshift state in which a driver requires an increase in the driving force, the driving force tends to decrease during the shifting, and thus causes the driver to have an uncomfortable feeling.

The downward gradient of the motor torque Tmg indicated by the arrow X requires the release-side friction element torque TA to also change at the downward gradient indicated by the arrow Y so as to ensure the inertia torque required by the input-related members. Engaging hydraulic pressure of each of the friction engagement elements on the release side is electronically controlled so as to make the pressure follow the change in the motor torque Tmg. However, slower response of the hydraulic pressure than that of the electronic control causes a difficulty in control of the release-side friction element torque TA in good response. This delays the time of the generation of the inertia torque in the input-related members, and causes a change in the gradient of change in the input rotational speed, such as a delay in the increase of the input rotational speed Nin, as indicated by an arrow W, causing a problem that, for example, a change in engine sound or a fluctuation on a tachometer occurs, and thus the driver has an uncomfortable feeling.

While the power-on downshift has been described as an example of conventional control, the same problems occur in a power-off upshift, a power-on upshift, and a power-off downshift.

Therefore, it is an object of the present invention to provide a hybrid drive device that generates at least a part of inertia torque during shifting from motor torque, and that can prevent a change in a gradient of change in an input rotational speed during the shifting, and can output a driving force according to a driving force requirement of a driver during the shifting, and thus can prevent an uncomfortable feeling from occurring during the shifting.

Means for Solving the Problems

A hybrid drive device (5) of the present invention is characterized (refer, for example, to FIGS. 1 to 11) by including:

an input member (15) drivingly coupled to an internal combustion engine (2), a motor (3) drivingly coupled to the input member (15), a stepped speed change mechanism (7) capable of shifting speed of rotation of the input member (15) by changing an engagement state of friction engagement elements (C-1, C-2, C-3, B-1, and B-2), and a control device (20) capable of controlling the engagement state of the friction engagement elements at least during the shifting, and capable of performing control so that motor torque (Tmg) output by the motor (3) produces at least a part of inertia torque (Ti) needed for rotation change of input-related members (such as 2a, 10, K0, 3a, and 15) drivingly coupled to the input member (15) during the shifting, wherein the control device (20) limits the motor torque (Tmg) in an inertia phase during the shifting to a set value (Tmg-lim) that has been set to or below a value having a smaller absolute value between values of performance limit torque (Tmg-max or Tmg-min) of the motor at times before and after the shifting, sets a target input rotational speed (Nin-targ) of the input member (15) during the shifting, and controls the engagement state of the friction engagement elements that control the rotation change of the input-related members in the inertia phase so as to generate the inertia torque (Ti) calculated from the target input rotational speed (Nin-targ) in the input-related members.

Accordingly, the motor torque in the inertia phase during the shifting is limited to the set value that has been set to or below a value having a smaller absolute value between values of the performance limit torque of the motor at the times before and after the shifting. This can prevent the motor torque from being changed by a change in the performance limit torque of the motor during the shifting. Because the engagement state of the friction engagement elements controlling the rotation change of the input-related members in the inertia phase is controlled so as to generate the inertia torque calculated from the target input rotational speed in the input-related members, the engagement state of the friction engagement elements controlling the rotation change of the input-related members can be controlled in a stable manner so as to make the rotational speed of the input member coincide with the target input rotational speed. This can prevent the change in the gradient of change in the input rotational speed during the shifting, and thus can prevent the uncomfortable feeling from occurring during the shifting.

Furthermore, the engagement state of the friction engagement elements controlling the rotation change of the input-related members, more specifically, the gradient of the change in the torque transmitted by the friction engagement elements can be set to a gradient at which the output torque to the wheels is generated according to the driving force requirement of the driver. This enables output of the driving force according to the driving force requirement of the driver during the shifting, thereby preventing the uncomfortable feeling from occurring during the shifting.

The hybrid drive device (5) of the present invention is characterized (refer, for example, to FIGS. 4, 5, 7, 9, and 11) in that the control device (20) performs smoothing control to moderate a change in the inertia torque (Ti) in an end period of the shifting, sets smoothing torque sharing ratios of the motor (3) and the friction engagement elements in the smoothing control, and, based on the smoothing torque sharing ratios, performs control so as to distribute torque to be shared by the motor (3) and the friction engagement elements in the smoothing control to the motor (3) and the friction engagement elements.

Thus, the smoothing torque sharing ratios of the motor and the friction engagement elements in the smoothing control are set, and, based on the smoothing torque sharing ratios, the control is performed so as to distribute the torque to be shared by the motor and the friction engagement elements in the smoothing control to the motor and the friction engagement elements. This can eliminate the necessity of changing the torque of the internal combustion engine in the smoothing control, and thus can prevent fluctuation such as engine racing or a drop in the input rotational speed that may occur when the smoothing control is performed using the internal combustion engine. Setting the smoothing torque sharing ratios of the motor and the friction engagement elements can prevent the motor torque from being required to exceed the performance limit torque of the motor, and thus can implement a good smoothing control that does not require either of the motor and the friction engagement elements to share excessive torque.

The hybrid drive device (5) of the present invention is characterized (refer, for example, to FIGS. 4, 5, 7, 9, and 11) in that the control device (20) sets the smoothing torque sharing ratios based on the engagement state of the friction engagement elements that control the rotation change of the input-related members in the inertia phase.

Thus, because the smoothing torque sharing ratios are set based on the engagement state of the friction engagement elements that control the rotation change of the input-related members in the inertia phase, the limit of torque that can be generated by the friction engagement elements can be prevented from being exceeded. Thus, a good smoothing control can be implemented.

The hybrid drive device (5) of the present invention is characterized (refer, for example, to FIGS. 4, 5, 7, 9, and 11) in that, in the smoothing control, the control device (20) controls in a feedback manner the motor (3) and the engagement state of the friction engagement elements based on an actual rotational speed (Nin) of the input member (15) with respect to the target input rotational speed (Nin-targ), and sets a feedback gain for the motor and a feedback gain for the friction engagement elements in the feedback control according to the smoothing torque sharing ratios.

Thus, because the feedback gains for the motor and the friction engagement elements in the feedback control of the smoothing control are set according to the respective smoothing torque sharing ratios, hunting in the feedback control or the like can be prevented to prevent divergence of the control. Thus, a good feedback control can be implemented.

The hybrid drive device (5) of the present invention is characterized (refer, for example, to FIGS. 4, 5, 7, 9, and 11) in that the control device (20) sets a start time (such as t13, t23, t33, or t43) of the feedback control of the motor (3) and a start time (such as t12, t22, t32, or t42) of the feedback control of the engagement state of the friction engagement elements according to the respective smoothing torque sharing ratios.

Thus, because the start time of the feedback control of the motor and the start time of the feedback control of the engagement state of the friction engagement elements are set according to the respective smoothing torque sharing ratios, a good feedback control can be implemented in consideration of the motor control whose response is particularly quicker than the hydraulic response of the friction engagement elements.

The symbols in the parentheses shown above are intended to be used for reference to the drawings. Those symbols are used for convenience to facilitate understanding of the invention, and do not have any influence on the constitution of the claims.

BRIEF DESCRIPTION OF THE DRAWINGS

FIG. 2 is an engagement table of a stepped speed change mechanism.

MODES FOR CARRYING OUT THE INVENTION

An embodiment according to the present invention will be described below based on FIGS. 1 to 11. First, based on FIG. 1, a description will be made on a hybrid automobile (vehicle) equipped with a hybrid drive device according to the present invention. This hybrid drive device is preferably mounted on a front-engine front-drive (FF) vehicle. The right-left direction in FIG. 1 corresponds to the right-left direction in the actual vehicle-mounted state. However, for convenience of description, the side of a driving source such as an engine is called the "front side", and the side opposite from the driving source side is called the "rear side". The term "drivingly coupled" refers to a state in which rotational elements are coupled to each other so as to be capable of transmitting a driving force therebetween, and is used as a concept including a state in which the rotational elements are coupled so as to rotate as a unit, or a state in which the rotational elements are coupled so as to be capable of transmitting the driving force via, for example, a clutch.

[Outline Structure of Hybrid Drive Device]

Figure 1:
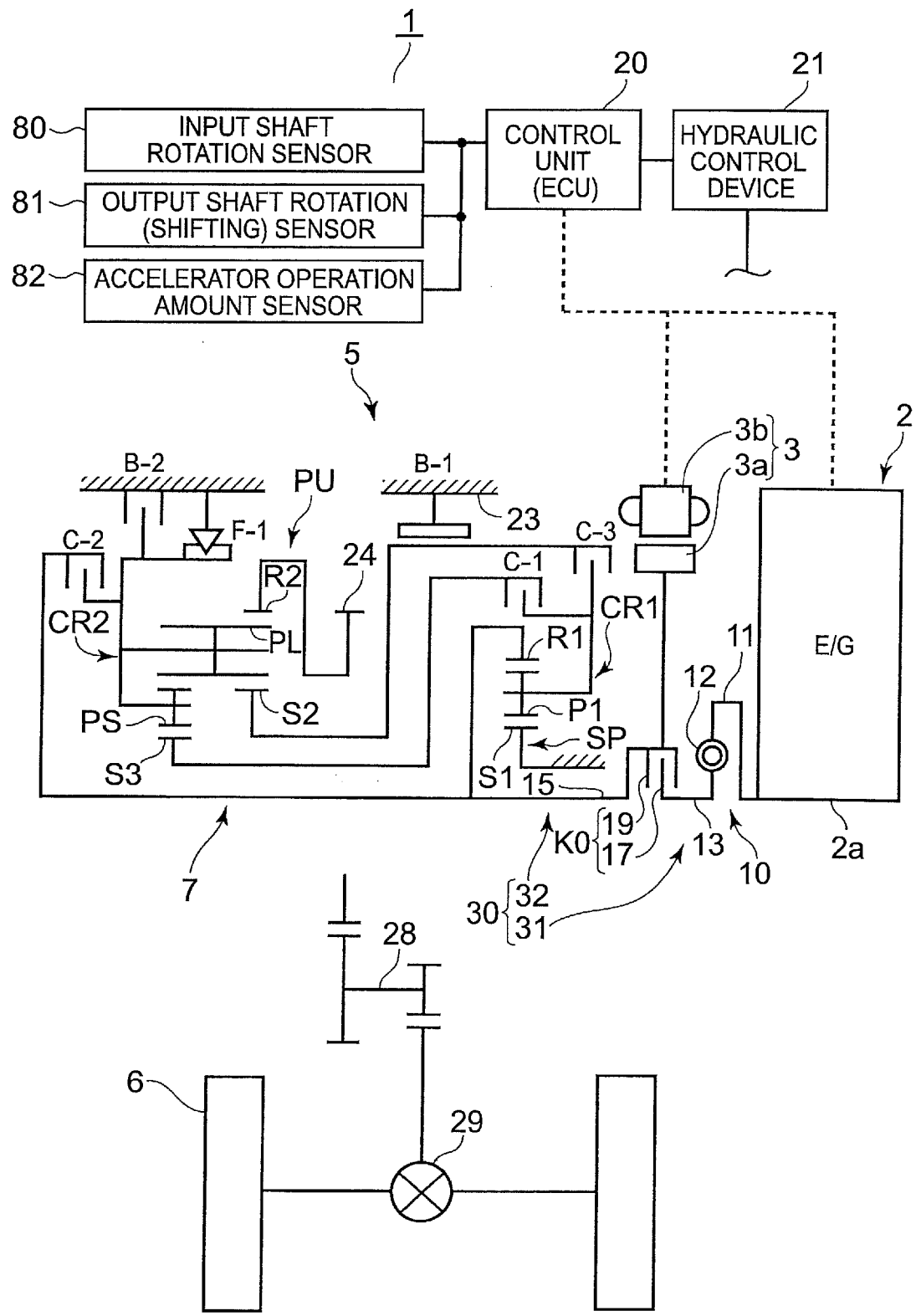
FIG. 1 is a schematic diagram showing a hybrid automobile to which the present invention can be applied.

As shown in FIG. 1, a hybrid vehicle 1 includes, in addition to an internal combustion engine 2, a motor-generator (motor) 3 as a driving source. A hybrid drive device 5 constituting a power train of the hybrid vehicle 1 includes: a stepped speed change mechanism 7 provided in a transmission path 30 between the internal combustion engine 2 and wheels 6; a power transmission device 10 that is disposed between the stepped speed change mechanism 7 and the internal combustion engine 2 and can transmit power by drivingly coupling the internal combustion engine 2 to an input shaft (input member) 15 of the stepped speed change mechanism 7; the motor 3 drivingly coupled to the input shaft 15; a hydraulic control device 21 that hydraulically controls friction engagement elements (clutches and brakes) (described later in detail) of the stepped speed change mechanism 7; and a control unit (ECU) 20 serving as a control device that can freely control the motor 3 and the internal combustion engine 2 through commands and can electronically control the hydraulic control device 21.

The control unit 20 is coupled to an input shaft rotation sensor 80 that detects a rotational speed (input rotational speed Nin) of the input shaft 15, an output shaft rotation (vehicle speed) sensor 81 that detects a rotational speed (output rotational speed Nout) of a counter gear 24 or a counter shaft 28 (described later in detail), and an accelerator operation amount sensor 82 that detects an accelerator operation amount that is a depression amount of an accelerator pedal (not shown). The control unit 20 stores therein a recorded shift map (not shown). The control unit 20 makes a shift determination by referring to the shift map based on the output rotational speed Nout (i.e., vehicle speed) and the accelerator operation amount, and performs shift control (power-on downshift, power-off upshift, power-on upshift, and power-off downshift) of the stepped speed change mechanism 7 (described later in detail).

The power transmission device 10 is composed of a damper 12 coupled to a crankshaft 2a of the internal combustion engine 2 via a drive plate 11, a connection shaft 13 connected to the damper 12, and a clutch K0 that connects and disconnects power transmission between the connection shaft 13 and the input shaft 15 of the stepped speed change mechanism 7. The clutch K0 is constituted by, for example, a multi-plate clutch, and is composed of an inner friction plate 17 drivingly coupled to the connection shaft 13 and an outer friction plate 19 drivingly coupled to the input shaft 15. In other words, the clutch K0 includes the inner friction plate 17 drivingly coupled to a transmission path 31 on the engine side of the transmission path 30 and the outer friction plate 19 drivingly coupled to a transmission path 32 on the wheel side of the transmission path 30.

Furthermore, the motor 3 is provided on the outer diameter side of the clutch K0 so as to overlap the clutch K0 in a position in the axial direction thereof. The motor 3 is composed of a rotor 3a drivingly coupled to the input shaft 15 and a stator 3b disposed outside in the radial direction of the rotor 3a so as to face it.

That is, when driving the vehicle using mainly a driving force of the internal combustion engine 2, the hybrid drive device 5 uses the control unit (ECU) 20 to control the hydraulic control device 21 so as to engage the clutch K0. During EV driving of driving the vehicle with only a driving force of the motor 3 drivingly coupled to the transmission path 32 on the wheel side, the hybrid drive device 5 releases the clutch K0 to disconnect the transmission path 31 on the engine side from the transmission path 32 on the wheel side, that is, to disconnect the internal combustion engine 2.

[Structure of Stepped Speed Change Mechanism]

A structure of the stepped speed change mechanism 7 will be described. The stepped speed change mechanism 7 includes a planetary gear SP and a planetary gear unit PU on the input shaft 15. The planetary gear SP includes a sun gear S1, a carrier CR1, and a ring gear R1. The carrier CR1 includes a pinion P1 meshing with the sun gear S1 and the ring gear R1. Thus, the planetary gear SP is what is called a single-pinion planetary gear.

The planetary gear unit PU includes four rotational elements of a sun gear S2, a sun gear S3, a carrier CR2, and a ring gear R2. The carrier CR2 includes a long pinion PL meshing with the sun gear S2 and the ring gear R2, and a short pinion PS meshing with the sun gear S3, in such a manner that the long pinion PL and the short pinion PS mesh with each other. Thus, the planetary gear unit PU is what is called a Ravigneaux-type planetary gear.

The sun gear S1 of the planetary gear SP is fixed to a case 23. The ring gear R1 of the planetary gear SP is drivingly coupled to the input shaft 15, and thus the rotation of the ring gear R1 is identical to the rotation of the input shaft 15 (hereinafter called "input rotation"). The stationary sun gear S1 and the input rotation of the ring gear R1 cause the carrier CR1 to do reduced-speed rotation obtained by reduction in the speed of the input rotation. The carrier CR1 is connected to a clutch C-1 and a clutch C-3.

The sun gear S2 of the planetary gear unit PU is connected to a brake B-1 composed of a band brake so as to be fixable to the case 23, and is connected to the clutch C-3 so as to be capable of introducing the reduced-speed rotation of the carrier CR1 via the clutch C-3. The sun gear S3 is connected to the clutch C-1 so as to be capable of introducing the reduced-speed rotation of the carrier CR1.

Furthermore, the carrier CR2 is connected to a clutch C-2 to which the rotation of the input shaft 15 is introduced so as to be capable of introducing the input rotation via the clutch C-2, and is connected to a one-way clutch F-1 and a brake B-2 so as to be restricted to rotate in one direction relative to the case 23 via the one-way clutch F-1 and so as to be capable of being held stationary via the brake B-2. The ring gear R2 is connected to the counter gear 24, which is, in turn, connected to the wheels 6 via the counter shaft 28 and a differential device 29.

By engagement and disengagement of the clutches C-1 to C-3, the brakes B-1 and B-2, and the one-way clutch F-1, which are shown in the skeleton diagram of FIG. 1, as shown in an engagement table of FIG. 2, the stepped speed change mechanism 7 having the above-described structure achieves a first forward speed (1st) to a sixth forward speed (6th), and a first reverse speed (Rev). During shifting, the friction engagement elements (clutches C-1 to C-3, and brakes B-1 and B-2) on a release side are released and the friction engagement elements on an engagement side are engaged according to the engagement table of FIG. 2.

[Shift Control of Power-On Downshift]

Figure 3:
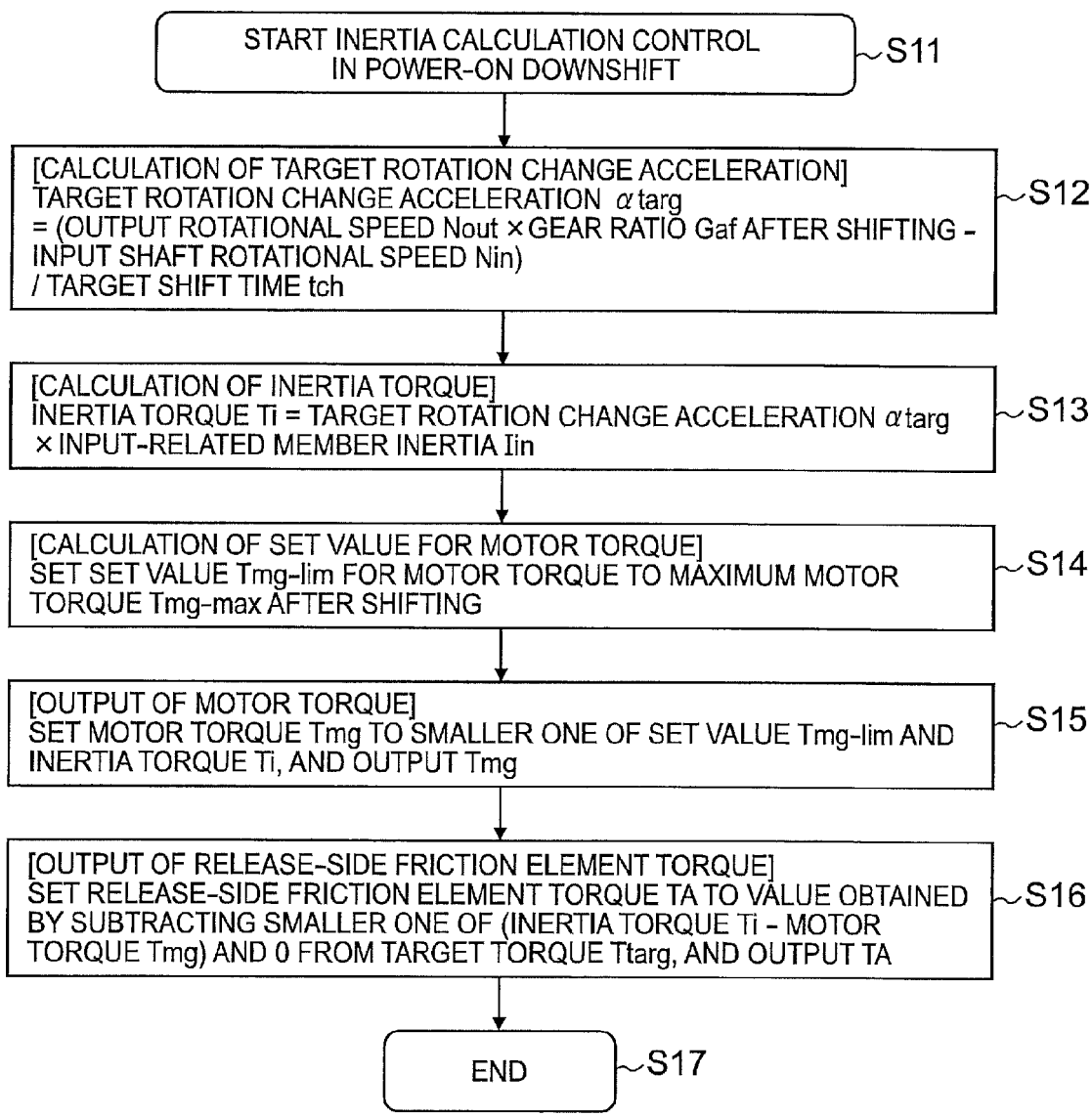
FIG. 3 is a flowchart showing inertia calculation control during a power-on downshift.

A description will be made on the shift control in the hybrid drive device 5 during the power-on downshift while the vehicle is traveling using mainly the driving force of the internal combustion engine 2, based on FIGS. 3 to 5. In FIG. 5, a period from a time t11 to a time t14 in which the input rotational speed Nin changes corresponds to a period of an "inertia phase", and a period from the time t14 to a time t16 corresponds to a period of a "torque phase" in which torque shares among the friction elements are switched. In an end period of the shifting from a time t12 to the time t16, "smoothing control" is performed to moderate a change in inertia torque Ti.

The power-on downshift refers to shifting downward while the accelerator is on, and corresponds to, for example, a shifting state such as a kickdown state. In the power-on downshift, the rotational speed of the members drivingly coupled to the input shaft 15 (input-related members), that is, the members including the input shaft 15, the rotor 3a of the motor 3, the clutch K0, the connection shaft 13, the damper 12, the drive plate 11, the crankshaft 2a of the internal combustion engine 2, and a clutch drum of the clutch C-2 and the ring gear R1 in the stepped speed change mechanism 7, which rotate at the same speed, increases after the shifting.

During the power-on downshift, the internal combustion engine 2 outputs the driving force based on the accelerator-on operation, and thus outputs torque to accelerate the rotation of the input-related members. Therefore, by loosening the engagement state (release state) (by reducing the transmitted torque) of the friction engagement elements on the release side (hereinafter called "release-side friction elements"), among the friction engagement elements (clutches C-1 to C-3, and brakes B-1 and B-2) that are subjected to engagement switching during the shifting, a portion of the engine torque Te acting on the input-related members, which is transmitted to the wheel side, is reduced. This can accelerate the rotation of the input-related members. Accordingly, during the power-on downshift, the control is performed in the inertia phase in which the rotation change is performed mainly by the release control of the release-side friction elements.

However, mere loosening of the engagement state of the release-side friction elements reduces the output torque (vehicle driving force) transmitted to the wheel side, and thus may lead to an uncomfortable feeling of the driver performing the accelerator-on operation. Therefore, to prevent the drop in the vehicle driving force, at least a part of the inertia torque can be generated from the motor torque. However, when the motor torque Tmg changes during the inertia phase, the release-side friction element torque TA needs to be changed in accordance with the change in the motor torque Tmg. Considering the response of the hydraulic control of the release-side friction elements slower than the response of the electric control of the motor 3, the input rotational speed Nin may change in the inertia phase as indicated by the arrow W of FIG. 12, and this may lead to the uncomfortable feeling of the driver.

Therefore, in the present embodiment, the control is performed as described below so as to allow the motor torque Tmg to be output in a stable manner with as small a change as possible during the inertia phase in which the motor torque Tmg and the release-side friction element torque TA share the inertia torque.

[Inertia Calculation Control of Power-On Downshift]

A description will be made on an inertia calculation during the power-on downshift, based on FIG. 3, with reference to FIG. 5. When the control unit 20 has determined to perform the power-on downshift based on the accelerator operation amount and the vehicle speed, for example, the control unit 20 starts inertia calculation control in the power-on downshift shown in FIG. 3 by the time t11 shown in FIG. 5 (S11).

The control unit 20 first sets a target input rotational speed Nin-targ in the inertia phase based on the input rotational speed Nin before the shifting, the input rotational speed Nin after the shifting (a value obtained by multiplying the output rotational speed Nout [i.e., vehicle speed] by a gear ratio Gaf after shifting), and a target shift time tch from the start to the end of the shifting. Here, to calculate the inertia torque Ti, in particular, the control unit 20 calculates a target rotation change acceleration atarg that is an acceleration of the target input rotational speed Nin-targ by dividing a value obtained by subtracting the input rotational speed Nin before the shifting from the input rotational speed Nin after the shifting by the target shift time tch (S12).

Then, the control unit 20 multiplies the target rotation change acceleration atarg calculated above by a total amount of inertia of the input-related members (hereinafter called "input-related member inertia") En to calculate the inertia torque Ti that is to be generated based on the rotation change of the input-related members (S13).

Then, the control unit 20 sets a set value serving as a limit of the motor torque in the inertia phase. Specifically, as shown in FIG. 5, the input rotational speed Nin, that is, a motor speed Nmg increases along with the downshifting, and thus, based on the performance characteristics of the motor, the maximum motor torque Tmg-max and a minimum motor torque Tmg-min serving as performance limits of the motor 3 (performance limit torque of the motor) decrease in absolute values along with the rotation change. For example, outputting the motor torque Tmg at the maximum motor torque Tmg-max serving as one of the performance limits of the motor 3 in order to generate the inertia torque Ti results in a drop in the motor torque Tmg during the inertia phase (refer to FIG. 12).

Therefore, based on the motor speed Nmg before the shifting that can be calculated from the gear ratio Gaf after shifting and the output rotational speed Nout, the control unit 20 sets a set value Tmg-lim to the maximum motor torque Tmg-max after the shifting (at the time t16) (i.e., the value having a smaller absolute value between values of the performance limit torque of the motor at the times before and after the shifting) so that the set value Tmg-lim serves as the upper limit value of the motor torque Tmg (S14).

While, in the present embodiment, the set value Tmg-lim is set to the maximum motor torque Tmg-max after the shifting (at the time t16), the motor torque Tmg is obviously prevented from changing during the inertia phase by setting the set value Tmg-lim to this value or below. However, from the viewpoint of generation of the inertia torque Ti, the set value Tmg-lim preferably has as large an absolute value as possible. Therefore, in the present embodiment, the set value Tmg-lim is set to the maximum motor torque Tmg-max after the shifting (at the time t16).

After setting the set value Tmg-lim as described above, the control unit 20 sets the motor torque Tmg to be actually output to smaller one of the set value Tmg-lim and the inertia torque Ti (when the inertia torque Ti is smaller than the set value Tmg-lim, sets the motor torque Tmg to be actually output so that the motor 3 generates all of the inertia torque Ti), and outputs the motor torque Tmg thus set (S15).

Furthermore, after setting the motor torque Tmg, the control unit 20 sets the release-side friction element torque TA to a value obtained by subtracting, from a target torque Ttarg, a smaller one of a value obtained by subtracting the motor torque Tmg from the inertia torque Ti and 0 (zero) (as given in a mathematical expression Ttarg{−Min((Ti−Tmg) or 0)}) (when the motor 3 generates all of the inertia torque Ti, sets the share of the release-side friction element torque TA to 0 because the release-side friction elements need not generate the inertia torque). In other words, the control unit 20 sets the torque to be shared by the release-side friction elements to a torque value reduced from the torque value required as the driving force to be output to the wheels indicated by a dashed line in FIG. 5; that is, the control unit 20 sets the release-side friction element torque TA so as to share the remaining part of the inertia torque, which cannot be generated from the motor torque Tmg. Then, the control unit 20 outputs a command such that the engaging pressure of the release-side friction elements is adjusted with the hydraulic control device 21 so as to obtain the release-side friction element torque TA (S16). Then, the inertia calculation control is terminated (S17).

After the inertia calculation control is terminated as described above, the actual shifting starts at the time t11. The motor torque Tmg is output at the set value Tmg-lim so as to supplement a part of the inertia torque Ti of the input-related members with the motor torque Tmg. Thus, the motor torque Tmg is output in a stable manner at a constant value without change as indicated by an arrow A, from the time t11 until a time t13 at which feedback control of the motor for the smoothing control (described later) starts.

The input torque Tin obtained by adding the engine torque Te to the motor torque Tmg is output along a value obtained by adding the set value Tmg-lim to the target torque Ttarg. That is, the input torque Tin is controlled in a range between an upper limit value obtained by adding the target torque Ttarg to the maximum motor torque Tmg-max and a lower limit value obtained by adding the target torque Ttarg to the minimum motor torque Tmg-min, in a stable manner without exceeding the limits of the motor performance.

The release-side friction elements are controlled so as to share the release-side friction element torque TA set as described above (so as to share the inertia torque remaining after the subtraction of the motor torque Tmg). Thus, the release-side friction element torque TA is controlled so as to change at an upward gradient as indicated by an arrow B from the time t11 until the time t12 at which the feedback control of the friction elements for the smoothing control (described later) starts, and the gradient can be set according to a driving force requirement of the driver. Accordingly, the output torque Tout also changes at a constant upward gradient as indicated by an arrow C during a period from the time t11 to the time t13, which gives the driver depressing the accelerator pedal a sense of the rising output torque Tout and prevents the driver from having the uncomfortable feeling during the shifting.

Furthermore, during the period from the time t11 to the time t13, the motor torque Tmg in the inertia phase during the shifting is limited to the set value Tmg-lim that has been set to or below the smaller value between the values of the performance limit torque of the motor (maximum motor torque Tmg-max) at the times before and after the shifting. This can prevent the motor torque Tmg from being changed by a change in the performance limit torque of the motor (maximum motor torque Tmg-max) during the shifting (refer to FIG. 12). Accordingly, the input rotational speed Nin (rotation change of the input-related members) increases in a stable manner at a constant gradient so as to reach the target input rotational speed Nin-targ as indicated by an arrow D. Therefore, for example, a change in engine sound and a fluctuation on a tachometer are prevented, thus preventing the driver from having the uncomfortable feeling during the shifting.

[Smoothing Control of Power-On Downshift]

Figure 12:
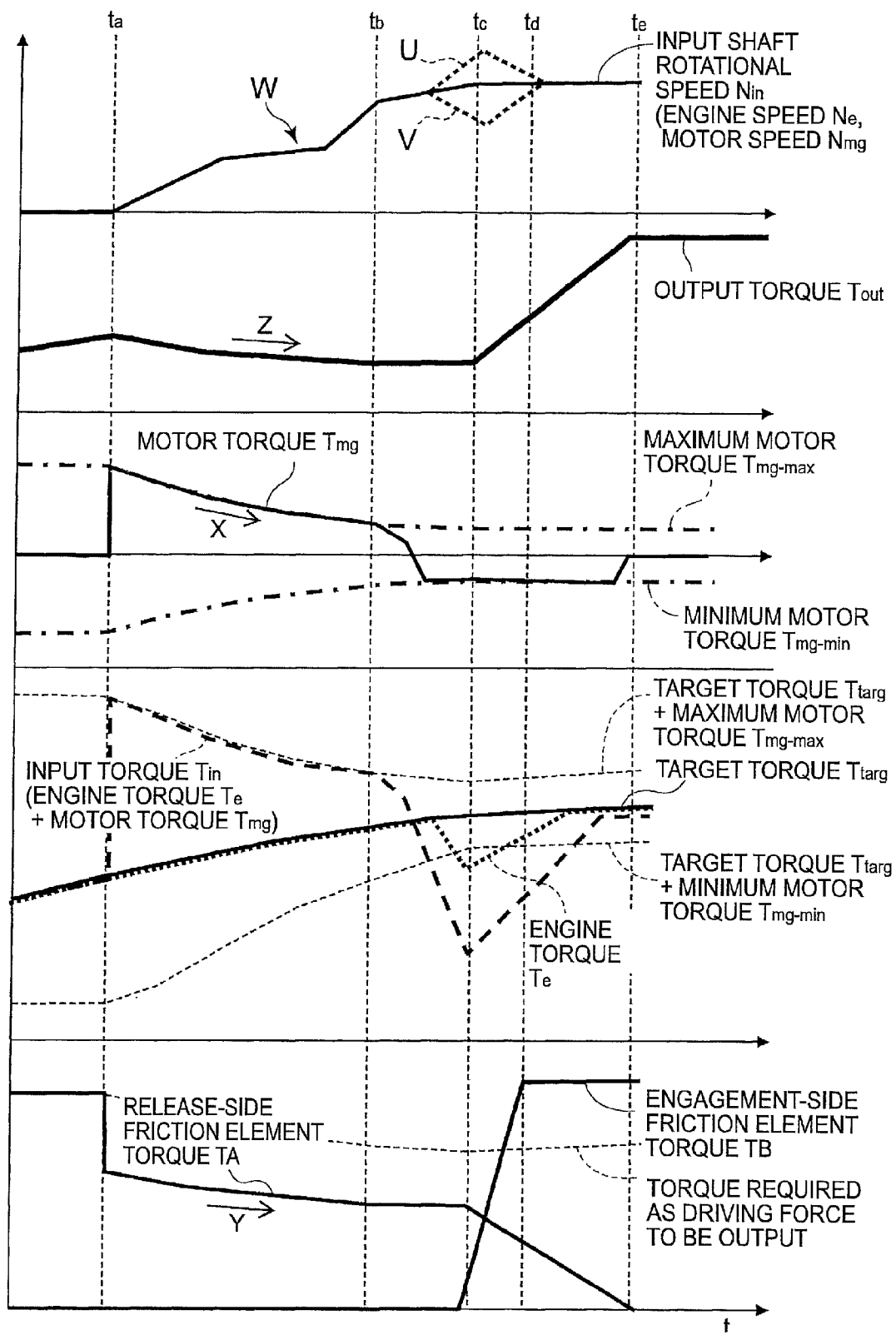
FIG. 12 is a timing chart showing the values during a conventional power-on downshift.

A description will now be made on the conventional control of the smoothing control to moderate the change in the inertia torque Ti in the end period of the shifting, based on FIG. 12. As shown in FIG. 12, in the end period of the shifting from a time tb to a time te, the input-related members gradually stop increasing in the rotational speed, that is, the rotational acceleration of the input-related members is switched into the decelerating direction. To decelerate the rotational speed increase of the input-related members, it has been necessary to control the motor torque Tmg in the negative direction and to reduce the torque of the internal combustion engine 2.

However, because the torque reduction of the internal combustion engine 2 is performed by adjusting the fuel injection amount or ignition timing, for example, the engine torque Te is not easily reduced in a stable manner as in the case of motor control or hydraulic control of the friction engagement elements. Thus, there has been a problem of relatively frequent occurrence of phenomena, such as what is called engine racing in which delayed reduction in the engine torque Te causes the input rotational speed Nin to temporarily increase, as indicated by a dashed line U, and a phenomenon in which too early reduction in the engine torque Te causes the input rotational speed NM to temporarily drop and remain lower, as indicated by a dashed line V.

Thus, the present embodiment makes it possible to complete the smoothing control without using the internal combustion engine 2 (engine torque Te), by controlling the motor 3 and controlling the engagement state of the release-side friction elements. The smoothing control according to the present embodiment will be described below based on FIGS. 4 and 5.

Figure 4:
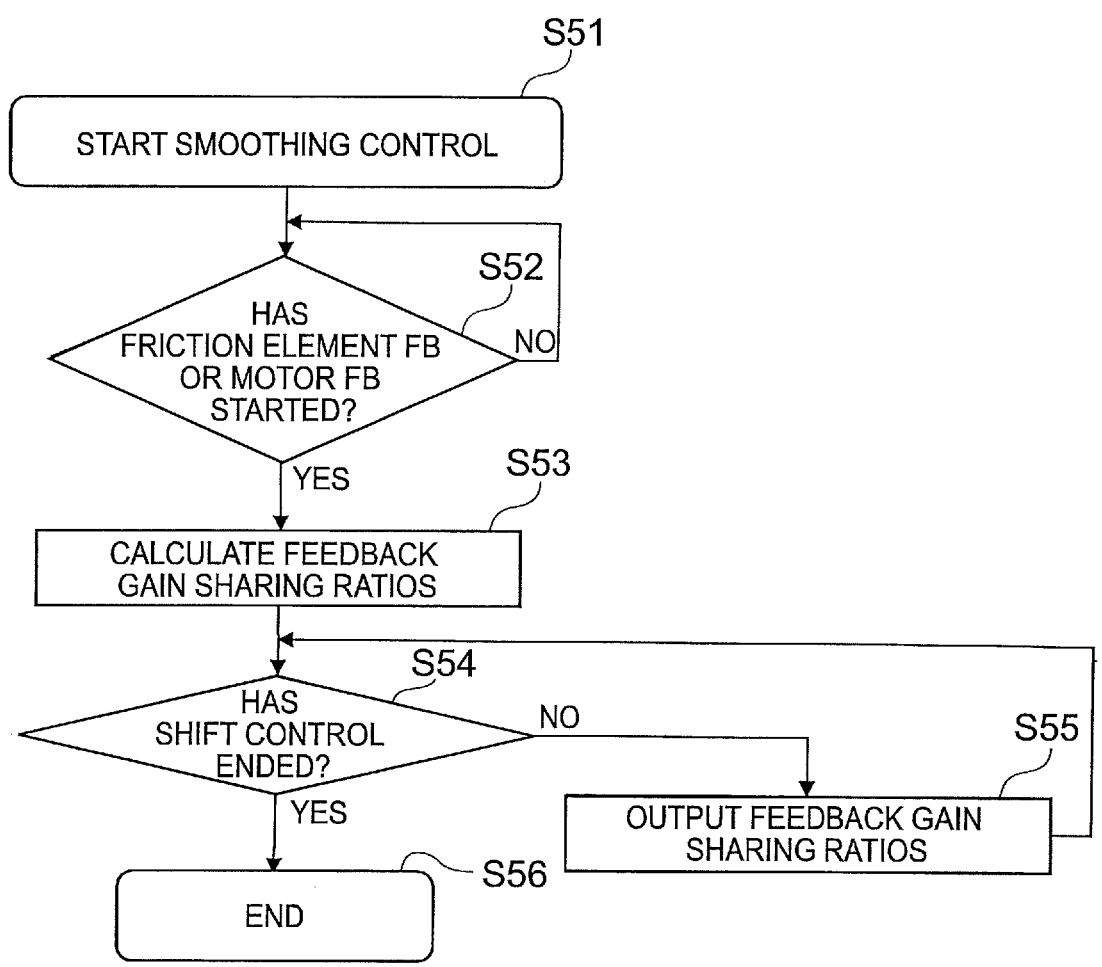
FIG. 4 is a flowchart showing smoothing control.
Figure 5:
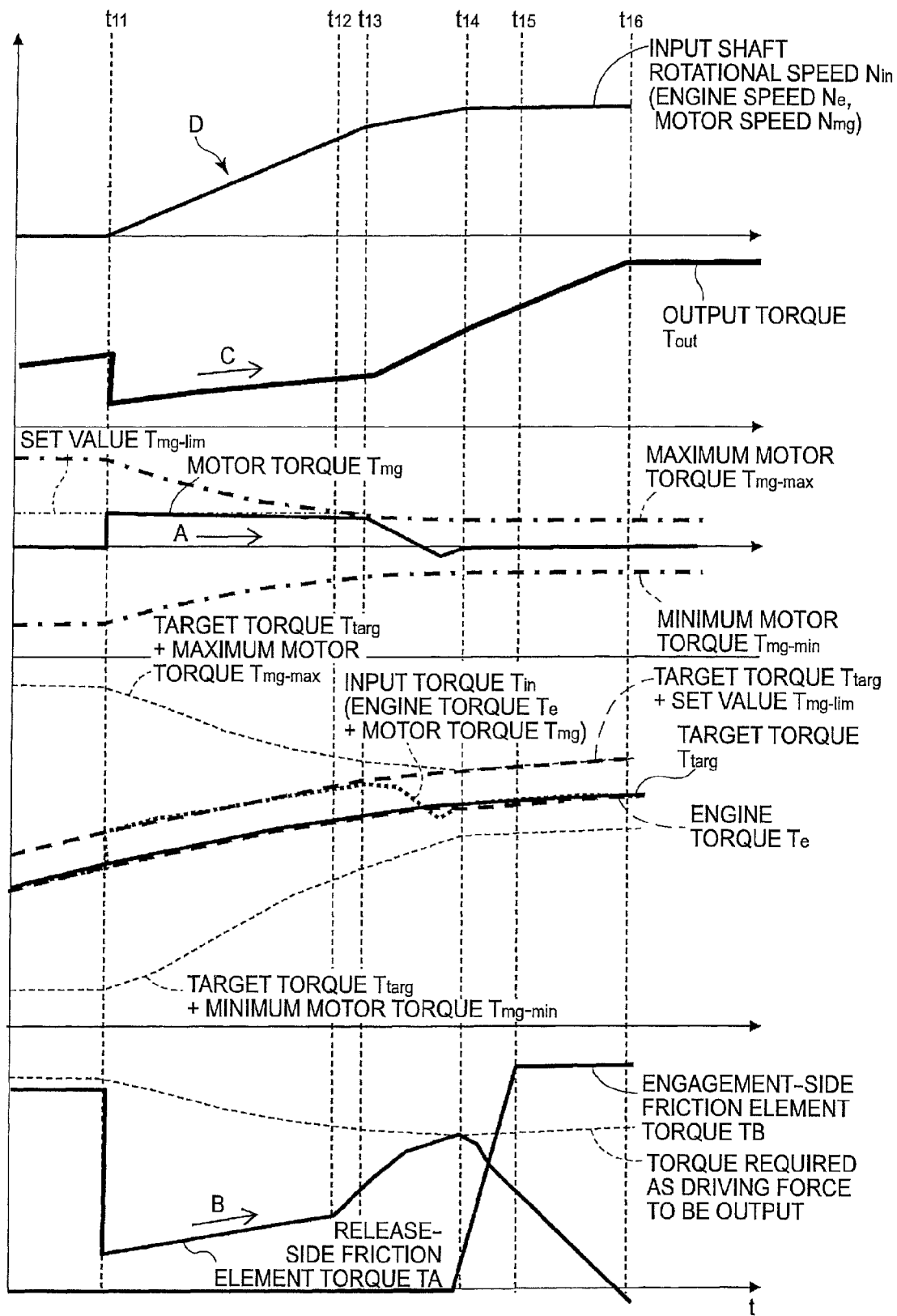
FIG. 5 is a timing chart showing values during the power-on downshift.

As shown in FIG. 4, when a shifting progression ratio based on, for example, a value of a speed ratio (ratio of the input rotational speed NM to the output rotational speed Nout) reaches a predetermined progression ratio, the control unit 20 starts the smoothing control (S51), and determines whether the feedback control (FB) of the release-side friction elements has started or the feedback control (FB) of the motor 3 has started so that the actual input rotational speed (actual rotational speed of the input shaft) Nin detected by the input shaft rotation sensor 80 reaches the target input rotational speed NM (S52).

The control unit 20 waits until the feedback control of the release-side friction elements or the feedback control of the motor 3 starts (No at S52), and when either of them has started (Yes at S52), sets smoothing torque sharing ratios of the motor torque Tmg and the release-side friction element torque TA (i.e., sharing ratios of the torque used in the smoothing control of the motor torque and the friction element torque). Then, according to the smoothing torque sharing ratios, the control unit 20 sets respective feedback gains, that is, a feedback gain for the release-side friction elements and a feedback gain for the motor 3 so as to distribute the torque shared in the smoothing control (S53).

Specifically, when setting the smoothing torque sharing ratios, the control unit 20 calculates a ratio of the maximum motor torque Tmg-max (or the minimum motor torque Tmg-min) to the inertia torque Ti as the smoothing torque sharing ratio of the motor 3, and obtains the remainder (100%−smoothing torque sharing ratio of motor 3) as the smoothing torque sharing ratio of the release-side friction elements. In other words, the maximum motor torque Tmg-max (or the minimum motor torque Tmg-min) reaches the set value Tmg-lim after the shifting, and thus, the ratio to the motor torque Tmg that has been output at the set value Tmg-lim can be calculated from the engagement state (i.e., the release-side friction element torque TA) of the release-side friction elements (friction engagement elements controlling the rotation change of the input-related members) in the inertia phase, so that the smoothing torque sharing ratios can be set based on the release-side friction element torque TA.

After the feedback gains for the release-side friction elements and the motor 3 are set according to the respective smoothing torque sharing ratios in this manner, the control unit 20 determines whether the shift control has ended (S54), and if the shift control has not ended (No at S54), outputs feedback gain sharing ratios (S55), that is, performs the feedback control of the release-side friction elements and the feedback control of the motor 3 with the respective shared gains.

Specifically, the control unit 20 multiplies the feedback gains for the release-side friction elements and the motor 3, which are set according to the respective smoothing torque sharing ratios, by a deviation obtained by subtracting the input rotational speed Nin from the target input rotational speed Nin-targ to obtain a deviation for the motor and a deviation for the release-side friction elements, and calculates motor feedback torque and release-side friction element feedback torque by applying proportional-integral control (PI-control) to the deviations for the motor and the release-side friction elements. The calculated feedback torque values are reflected on the output of the motor 3 and the hydraulic control of the release-side friction elements. Thereafter, if the control unit 20 determines that the shift control has ended at the time t16 (Yes at S54), the smoothing control is terminated (S56).

The response of the motor 3 in the output control thereof is quicker than the hydraulic response of the release-side friction elements. Thus, starting the feedback control at the same time may result in a delay in the response of the release-side friction elements. Therefore, as shown in FIG. 5, the feedback control of the release-side friction elements starts at the time t12 that is a start time obtained based on the time t13 serving as the start time of the feedback control of the motor 3 while taking into account the amount of delay in the response of the release-side friction elements and the smoothing torque sharing ratios.

Accordingly, as shown in FIG. 5, increasing the release-side friction element torque TA from the time t12 increases the torque transmitted to the wheel side to start reducing the inertia torque Ti to the input-related members (i.e., reduce the rotation change), and reducing the motor torque Tmg (input torque Tin) from the time t13 gradually reduces the inertia torque Ti and finally reduces it to zero. During that time, engagement-side friction elements are hydraulically controlled to start engaging at the time t14, and engagement-side friction element torque TB is increased while the release-side friction element torque TA is reduced, that is, the torque phase starts, in which the torque transmission is shifted from the release-side friction elements to the engagement-side friction elements. Then, the engagement-side friction elements are placed in the engagement state at a time t15, and further, by the time t16, releasing the release-side friction elements causes output of the output torque Tout according to the gear ratio after the shifting. At the time t16, the shift control is terminated.

As described above, the smoothing control sets the smoothing torque sharing ratios of the motor 3 and the release-side friction engagement elements, and based on the smoothing torque sharing ratios, performs control so as to distribute, to the motor 3 and the release-side friction engagement elements, the torque to be shared therebetween in the smoothing control. This can eliminate the necessity of changing the torque of the internal combustion engine 2 in the smoothing control, and thus prevents fluctuation such as engine racing or a drop in the input rotational speed Nin that may occur when the smoothing control is performed using the internal combustion engine 2. Setting the smoothing torque sharing ratios of the motor 3 and the friction engagement elements can prevent the motor torque Tmg from being required to exceed the performance limit torque of the motor 3 (the maximum motor torque Tmg-max or the minimum motor torque Tmg-min), and thus implements a good smoothing control that does not require either of the motor 3 and the friction engagement elements to share excessive torque.

Because the smoothing torque sharing ratios are set based on the engagement state of the release-side friction elements in the inertia phase, the limit of torque that can be generated by the release-side friction elements can be prevented from being exceeded. Thus, a good smoothing control can be implemented.

Because the feedback gains for the motor and the release-side friction elements in the feedback control of the smoothing control are set according to the respective smoothing torque sharing ratios, hunting in the feedback control or the like can be prevented to prevent divergence of the control. Thus, a good feedback control can be implemented.

Because the start time of the feedback control of the motor and the start time of the feedback control of the engagement state of the friction engagement elements are set according to the respective smoothing torque sharing ratios, a good feedback control can be implemented in consideration of the motor control whose response is particularly quicker than the hydraulic response of the release-side friction elements.

While, in the present embodiment, the smoothing torque sharing ratios are set based on the engagement state of the release-side friction elements in the inertia phase (i.e., the inertia torque sharing ratios of the motor torque Tmg and the release-side friction element torque TB in the inertia phase), the smoothing torque sharing ratios may be reset to new values taking into account, for example, an end time of the smoothing control. Also in this case, it is certainly preferable to set the smoothing torque sharing ratios so that the motor torque Tmg does not exceed the set value Tmg-lim.

[Shift Control of Power-Off Upshift]

Figure 6:
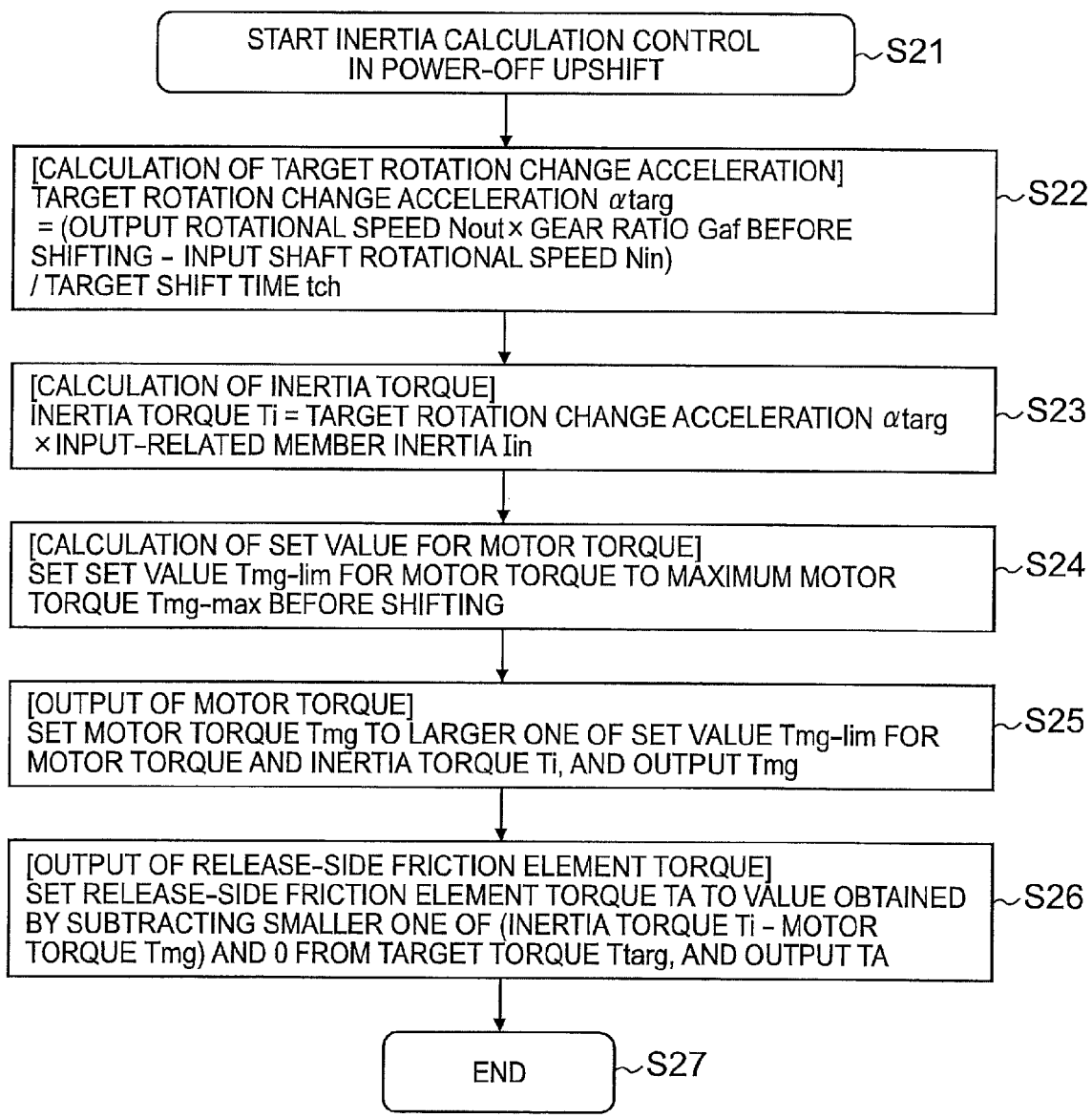
FIG. 6 is a flowchart showing the inertia calculation control during a power-off upshift.
Figure 7:
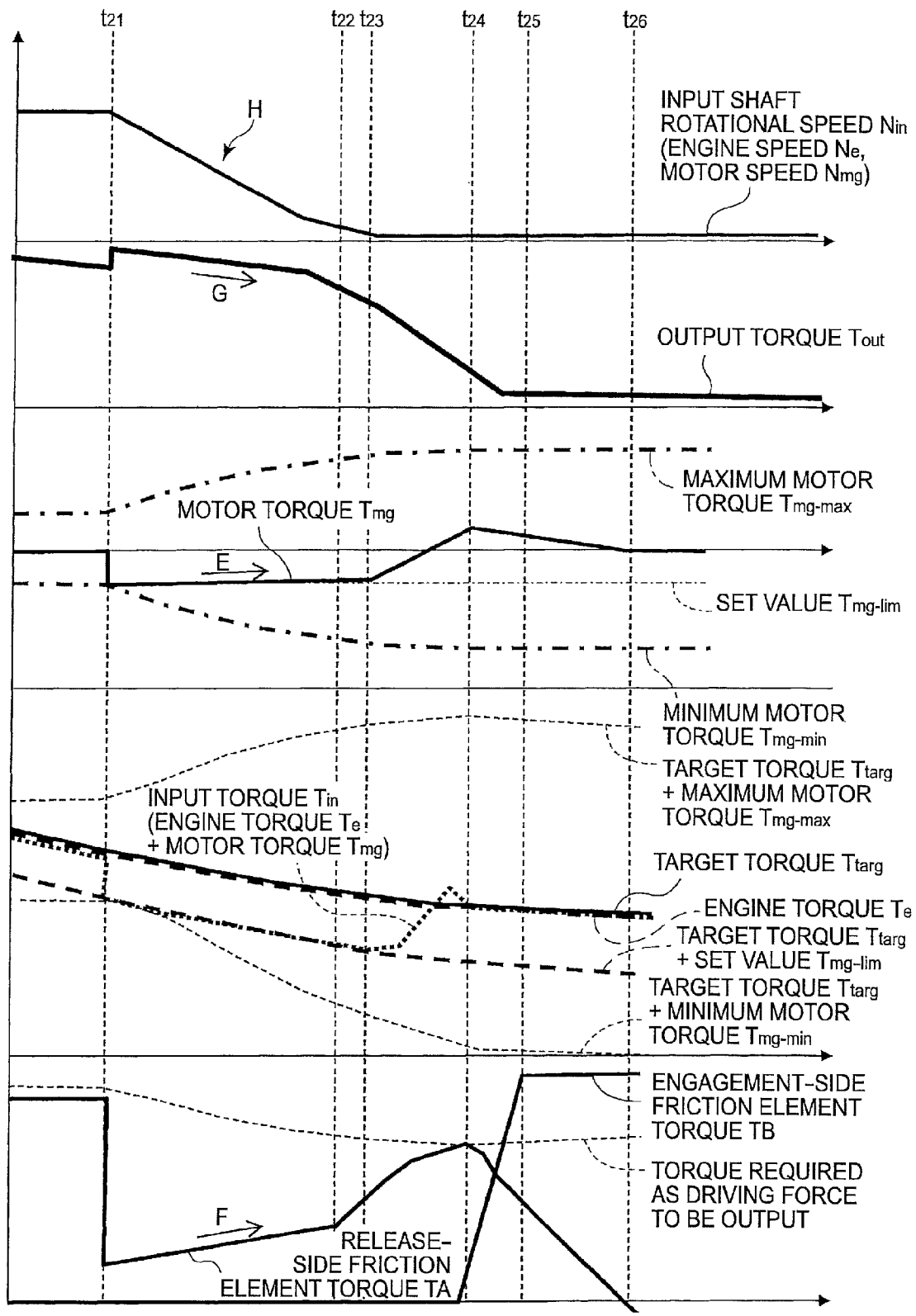
FIG. 7 is a timing chart showing the values during the power-off upshift.

A description will be made on the shift control during the power-off upshift while the vehicle is traveling using mainly the driving force of the internal combustion engine 2, based on FIGS. 6 and 7. In FIG. 7, a period from a time t21 to a time t24 in which the input rotational speed Nin changes corresponds to the period of the "inertia phase", and a period from the time t24 to a time t26 corresponds to the period of the "torque phase" in which the torque shares among the friction elements are switched. In the end period of the shifting from a time t22 to the time t26, the "smoothing control" is performed to moderate the change in inertia torque Ti.

The power-off upshift refers to shifting upward while the accelerator is off, and corresponds to what is called an off-up shifting state. In the power-off upshift, the rotational speed of the input shaft 15 (input-related members) decreases after the shifting.

During the power-off upshift, the internal combustion engine 2 stops outputting the driving force based on the accelerator-off operation, and thus outputs negative torque to decelerate the rotation of the input-related members. Therefore, loosening the engagement state (release state) (reducing the transmitted torque) of the release-side friction elements reduces the amount of vehicle inertia torque that is transmitted back to the internal combustion engine 2 from the wheel side and acts on the input-related members. This can decelerate the rotation of the input-related members. Accordingly, during the power-off upshift, the control is performed in the inertia phase in which the rotation change is performed mainly by the release control of the release-side friction elements.

However, mere loosening of the engagement state of the release-side friction elements causes a sense of acceleration based on a reduction in the negative torque (engine braking torque) transmitted to the wheel side and generation of the inertia torque Ti, and thus can lead to an uncomfortable feeling of the driver performing the accelerator-off operation. Therefore, to prevent the increase in the vehicle driving force, at least a part of the inertia torque can be generated from (or canceled by) the motor torque (negative torque or regenerative torque). However, when the motor torque Tmg changes during the inertia phase, the release-side friction element torque TA needs to be changed in accordance with the change in the motor torque Tmg. Considering the response of the hydraulic control of the release-side friction elements slower than the response of the electric control of the motor 3, the input rotational speed Nin may change in the inertia phase, and this may lead to the uncomfortable feeling of the driver.

Therefore, in the same manner as in the case of the above-described power-on downshift, the control is performed as described below so as to allow the motor torque Tmg to be output in a stable manner with as small a change as possible during the inertia phase in which the motor torque Tmg and the release-side friction element torque TA share the inertia torque.

[Inertia Calculation Control of Power-Off Upshift]

A description will be made on the inertia calculation during the power-off upshift, based on FIG. 6, with reference to FIG. 7. When the control unit 20 has determined to perform the power-off upshift based on, for example, the accelerator operation amount and the vehicle speed, the control unit 20 starts the inertia calculation control in the power-off upshift shown in FIG. 6 by the time t21 shown in FIG. 7 (S21).

In the same manner as in the case of Steps S12 and S13 in the power-on downshift, the control unit 20 first sets the target input rotational speed Nin-targ, and calculates the target rotation change acceleration atarg that is the acceleration of the target input rotational speed Nin-targ by dividing a value obtained by subtracting the input rotational speed NM before the shifting from the input rotational speed NM after the shifting by the target shift time tch (S22). Then, the control unit 20 multiplies the calculated target rotation change acceleration atarg by the input-related member inertia Iin to calculate the inertia torque Ti that is to be generated based on the rotation change of the input-related members (S23).

In the power-off upshift, as shown in FIG. 7, the input rotational speed Nin, that is, the motor speed Nmg decreases along with the upshifting, reaching a lower speed after the shifting, and thus, based on the performance characteristics of the motor, the maximum motor torque Tmg-max and the minimum motor torque Tmg-min serving as the performance limits of the motor 3 increase in absolute values along with the rotation change. For example, outputting the motor torque Tmg at the minimum motor torque Tmg-min serving as one of the performance limits of the motor 3 in order to generate the inertia torque Ti results in an increase in the motor torque Tmg during the inertia phase.

Therefore, based on the motor speed Nmg before the shifting that can be calculated from a gear ratio Gbe before shifting and the output rotational speed Nout, the control unit 20 sets the set value Tmg-lim to the minimum motor torque Tmg-min before the shifting (at the time t21) (i.e., the value having a smaller absolute value between values of the performance limit torque of the motor at the times before and after the shifting) so that the set value Tmg-lim serves as the lower limit value of the motor torque Tmg (S24).

While, in the present embodiment, the set value Tmg-lim is set to the minimum motor torque Tmg-min before the shifting (at the time t21), the motor torque Tmg is obviously prevented from changing during the inertia phase by setting the set value Tmg-lim to a value having an absolute value of this value or less. However, from the viewpoint of generation of the inertia torque Ti, the set value Tmg-lim preferably has as large an absolute value as possible. Therefore, in the present embodiment, the set value Tmg-lim is set to the minimum motor torque Tmg-min before the shifting (at the time t21).

After setting the set value Tmg-lim in this manner, the control unit 20 sets the motor torque Tmg to be actually output to larger one of the set value Tmg-lim and the inertia torque Ti (one that has a smaller absolute value) (when the inertia torque Ti is larger than the set value Tmg-lim, sets the motor torque Tmg to be actually output so that the motor 3 generates all of the inertia torque Ti), and outputs the motor torque Tmg thus set (S25).

Furthermore, after setting the motor torque Tmg, the control unit 20 sets the release-side friction element torque TA to a value obtained by subtracting, from the target torque Ttarg, a smaller one of a value obtained by subtracting the motor torque Tmg from the inertia torque Ti and 0 (zero) (as given in the mathematical expression Ttarg$\{-\text{Min}((Ti-Tmg) \text{ or } 0)\}$) (when the motor 3 generates all of the inertia torque Ti, sets the share of the release-side friction element torque TA to 0 because the release-side friction elements need not generate the inertia torque). In other words, the control unit 20 sets the torque to be shared by the release-side friction elements to a torque value reduced from the torque value required as the driving force to be output to the wheels indicated by a dashed line in FIG. 7; that is, the control unit 20 sets the release-side friction element torque TA so as to share the remaining part of the inertia torque, which cannot be generated from the motor torque Tmg. Then, the control unit 20 outputs a command such that the engaging pressure of the release-side friction elements is adjusted with the hydraulic control device 21 so as to obtain the release-side friction element torque TA (S26). Then, the inertia calculation control is terminated (S27).

After the inertia calculation control is terminated as described above, the actual shifting starts at the time t21. The motor torque Tmg is output at the set value Tmg-lim so as to supplement a part of the inertia torque Ti of the input-related members with the motor torque Tmg. Thus, the motor torque Tmg is output in a stable manner at a constant value without change as indicated by an arrow E, from the time t21 until a time t23 at which feedback control of the motor for the smoothing control (described later) starts.

Accordingly, the input torque Tin obtained by adding the engine torque Te to the motor torque Tmg is output along a value obtained by adding the set value Tmg-lim to the target torque Ttarg. That is, the input torque Tin is controlled in a range between an upper limit value obtained by adding the target torque Ttarg to the minimum motor torque Tmg-min and a lower limit value obtained by adding the target torque Ttarg to the minimum motor torque Tmg-min, in a stable manner without exceeding the limits of the motor performance.

The release-side friction elements are controlled so as to share the release-side friction element torque TA set as described above (so as to share the inertia torque remaining after the subtraction of the motor torque Tmg). Thus, the release-side friction element torque TA is controlled so as to change at an upward gradient as indicated by an arrow F from the time t21 until the time t22 at which the feedback control of the friction elements for the smoothing control (described later) starts. Accordingly, the output torque Tout changes at a downward gradient as indicated by an arrow G during a period from the time t21 to the time t24, which gives the driver releasing (turning off) the accelerator pedal a sense of the falling output torque Tout, thus preventing the driver from having the uncomfortable feeling during the shifting.

Furthermore, during the period from the time t21 to the time t23, the motor torque Tmg in the inertia phase during the shifting is limited to the set value Tmg-lim that has been set to or below a value having a smaller absolute value between values of the performance limit torque of the motor (minimum motor torque Tmg-min) at the times before the shifting. This can prevent the motor torque Tmg from being changed by a change in the performance limit torque of the motor (minimum motor torque Tmg-min) during the shifting. Accordingly, the input rotational speed Nin (rotation change of the input-related members) decreases in a stable manner at a substantially constant gradient so as to reach the target input rotational speed Nin-targ as indicated by an arrow H. Therefore, for example, the change in the engine sound and the fluctuation on the tachometer are prevented, thus preventing the driver from having the uncomfortable feeling during the shifting.

[Smoothing Control of Power-Off Upshift]

A description will be made on the smoothing control in the power-off upshift. The smoothing control shown in FIG. 4 is also performed in the power-off upshift. Specifically, when the shifting progression ratio reaches the predetermined progression ratio, the control unit 20 starts the smoothing control (S51), and determines whether the feedback control (FB) of the release-side friction elements has started or the feedback control (FB) of the motor 3 has started (S52). When the feedback control of either of them has started (Yes at S52), the control unit 20 sets the smoothing torque sharing ratios of the motor torque Tmg and the release-side friction element torque TA, and, according to the smoothing torque sharing ratios, sets the respective feedback gains, that is, the feedback gain for the release-side friction elements and the feedback gain for the motor 3 so as to distribute the torque shared in the smoothing control (S53).

The control unit 20 sets the smoothing torque sharing ratios by calculating the ratio of the maximum motor torque Tmg-max (or the minimum motor torque Tmg-min) to the inertia torque Ti as the smoothing torque sharing ratio of the motor 3, and obtaining the remainder (100%−smoothing torque sharing ratio of motor 3) as the smoothing torque sharing ratio of the release-side friction elements.

After the feedback gains for the release-side friction elements and the motor 3 are set according to the respective smoothing torque sharing ratios in this manner, the control unit 20 determines whether the shift control has ended (S54), and if the shift control has not ended (No at S54), outputs the feedback gain sharing ratios (S55), that is, performs the feedback control of the release-side friction elements and the feedback control of the motor 3 with the respective shared gains. If the control unit 20 determines that the shift control has ended at the time t26 (Yes at S54), the smoothing control is terminated (S56).

In the same manner as has been described above, the response of the motor 3 in the output control thereof is quicker than the hydraulic response of the release-side friction elements. Thus, starting the feedback control at the same time may result in a delay in the response of the release-side friction elements. Therefore, as shown in FIG. 7, the feedback control of the release-side friction elements starts at the time t22 that is a start time obtained based on the time t23 serving as the start time of the feedback control of the motor 3 while taking into account the amount of delay in the response of the release-side friction elements and the smoothing torque sharing ratios.

Accordingly, as shown in FIG. 7, increasing the release-side friction element torque TA from the time t22 increases the torque transmitted to the wheel side to start reducing the inertia torque Ti to the input-related members (i.e., reduce the rotation change), and increasing (reducing the absolute value of) the motor torque Tmg (input torque Tin) from the time t23 gradually reduces the inertia torque Ti and finally reduces it to zero. During that time, the engagement-side friction elements are hydraulically controlled to start engaging at the time t24, and the engagement-side friction element torque TB is increased while the release-side friction element torque TA is reduced, that is, the torque phase starts, in which the torque transmission is shifted from the release-side friction elements to the engagement-side friction elements. Then, the engagement-side friction elements are placed in the engagement state at a time t25, and further, by the time t26, releasing the release-side friction elements causes output of the output torque Tout according to the gear ratio after the shifting. At the time t26, the shift control is terminated.

As described above, the smoothing control of the power-off upshift also sets the smoothing torque sharing ratios of the motor 3 and the release-side friction engagement elements, and based on the smoothing torque sharing ratios, performs control so as to distribute, to the motor 3 and the release-side friction engagement elements, the torque to be shared therebetween in the smoothing control. This can eliminate the necessity of changing the torque of the internal combustion engine 2 in the smoothing control, and thus prevents the fluctuation such as the engine racing or the drop in the input rotational speed NM that may occur when the smoothing control is performed using the internal combustion engine 2. Setting the smoothing torque sharing ratios of the motor 3 and the friction engagement elements can prevent the motor torque Tmg from being required to exceed the performance limit torque of the motor 3 (the maximum motor torque Tmg-max or the minimum motor torque Tmg-min), and thus implements a good smoothing control that does not require either of the motor 3 and the friction engagement elements to share excessive torque.

Because the smoothing torque sharing ratios are set based on the engagement state of the release-side friction elements in the inertia phase, the limit of torque that can be generated by the release-side friction elements can be prevented from being exceeded. Thus, a good smoothing control can be implemented.

Because the feedback gains for the motor and the release-side friction elements in the feedback control of the smoothing control are set according to the respective smoothing torque sharing ratios, hunting in the feedback control or the like can be prevented to prevent divergence of the control. Thus, a good feedback control can be implemented.

Because the start time of the feedback control of the motor and the start time of the feedback control of the engagement state of the friction engagement elements are set according to the respective smoothing torque sharing ratios, a good feedback control can be implemented in consideration of the motor control whose response is particularly quicker than the hydraulic response of the release-side friction elements.

[Shift Control of Power-On Upshift]

Figure 8:
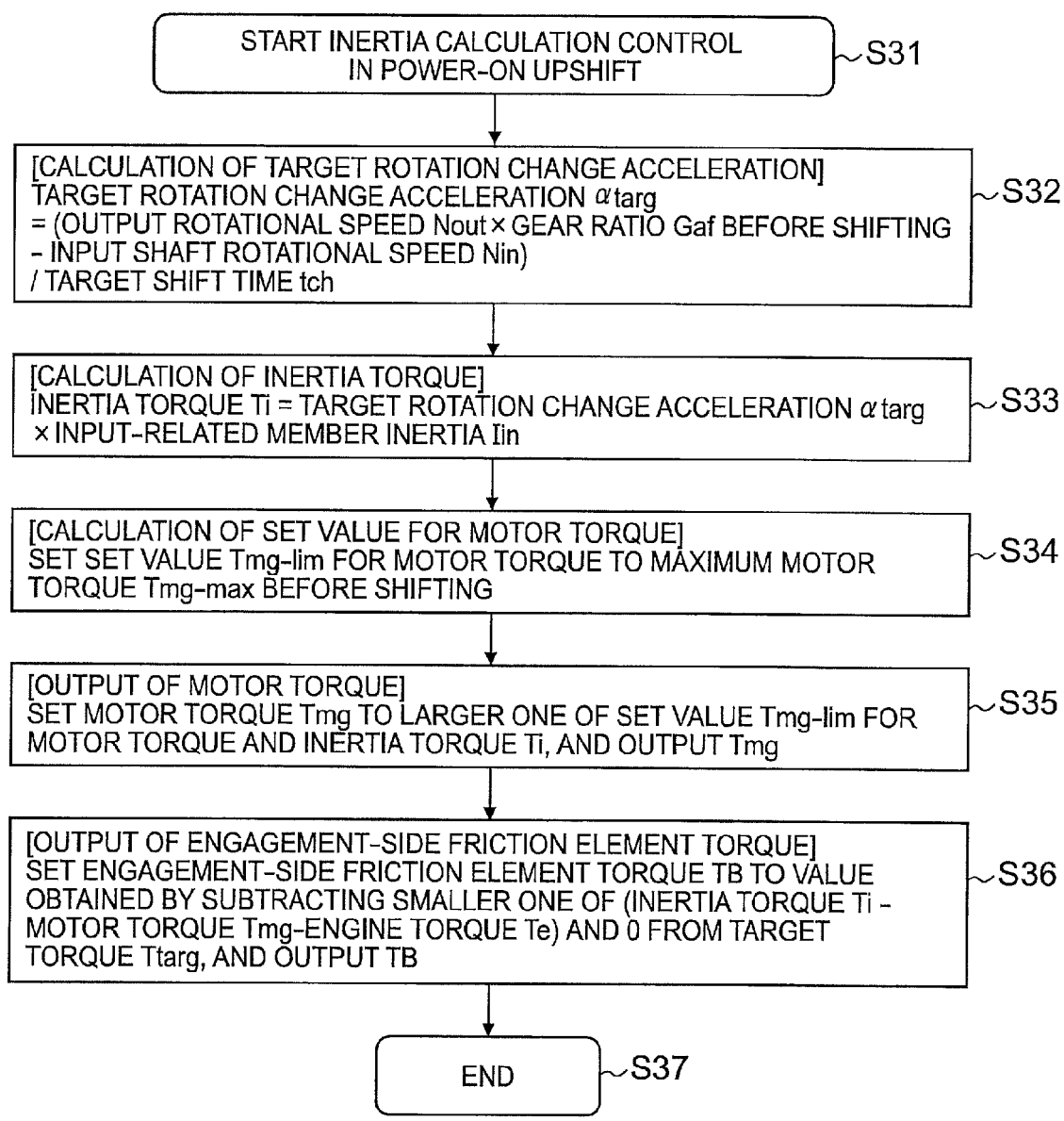
FIG. 8 is a flowchart showing the inertia calculation control during a power-on upshift.
Figure 9:
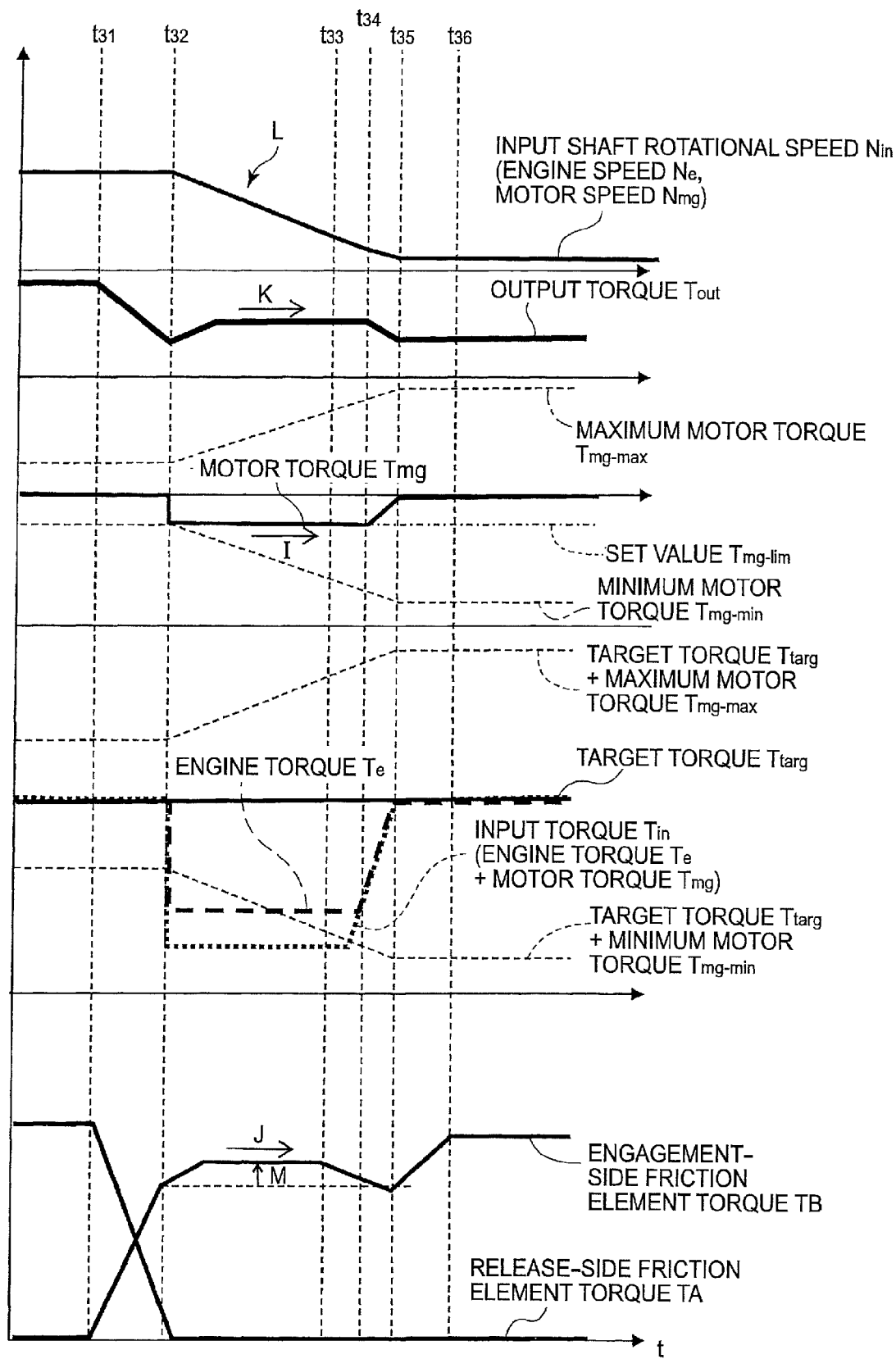
FIG. 9 is a timing chart showing the values during the power-on upshift.

A description will be made on the shift control during the power-on upshift while the vehicle is traveling using mainly the driving force of the internal combustion engine 2, based on FIGS. 8 and 9. In FIG. 9, a period from a time t31 to a time t32 corresponds to the period of the "torque phase" in which the torque shares among the friction elements are switched, and a period from the time t32 to a time t36 in which the input rotational speed NM changes corresponds to the period of the "inertia phase". In the end period of the shifting from a time t33 to the time t36, the "smoothing control" is performed to moderate the change in inertia torque Ti.

The power-on upshift refers to shifting upward while the accelerator is on, in other words, a state of shifting up during acceleration. In the power-on upshift, the rotational speed of the input shaft 15 (input-related members) decreases after the shifting.

During the power-on upshift, the internal combustion engine 2 outputs the driving force based on the accelerator-on operation, and thus outputs positive torque to accelerate the rotation of the input-related members. Releasing the release-side friction elements merely accelerates the rotation of the input-related members. Therefore, by tightening the engagement state (increasing the transmitted torque) of the engagement-side friction elements, a larger amount of vehicle inertia torque is transmitted back to the internal combustion engine 2 from the wheel side and acts on the input-related members. This can decelerate the rotation of the input-related members. Accordingly, in the power-on upshift, the control is performed first in the torque phase in which the torque shares are switched between the release-side friction elements and the engagement-side friction elements, and then in the inertia phase in which the rotation change is performed mainly by the engagement control of the engagement-side friction elements.

In the inertia phase of reducing the rotational speed of the input-related members, the use of only the rotation control of the input-related members performed by the engagement-side friction elements imposes a large load on the engagement-side friction elements. Therefore, the torque reduction of the internal combustion engine 2 is also used to reduce the rotational speed of the input-related members.

Further, the use of only the torque reduction of the internal combustion engine 2 may impose a large load on the engagement-side friction elements in the inertia phase. Therefore, to reduce the load of the engagement-side friction elements, at least a part of the inertia torque can be generated from (or canceled by) the motor torque (negative torque or regenerative torque). However, when the motor torque Tmg changes during the inertia phase, the engagement-side friction element torque TB needs to be changed in accordance with the change in the motor torque Tmg. Considering the response of the hydraulic control of the engagement-side friction elements slower than the response of the electric control of the motor 3, the input rotational speed Nin may change in the inertia phase, and this may lead to the uncomfortable feeling of the driver.

Therefore, in the same manner as in the above-described cases of the power-on downshift and the power-off upshift, the control is performed as described below so as to allow the motor torque Tmg to be output in a stable manner with as small a change as possible during the inertia phase in which the engine torque Te (with the torque reduced), the motor torque Tmg, and the engagement-side friction element torque TB share the inertia torque.

[Inertia Calculation Control of Power-On Upshift]

A description will be made on the inertia calculation during the power-on upshift, based on FIG. 8, with reference to FIG. 9. When the control unit 20 has determined to perform the power-on upshift based on, for example, the accelerator operation amount and the vehicle speed, the control unit 20 starts the inertia calculation control in the power-on upshift shown in FIG. 8 by the time t31 shown in FIG. 9 (S31).

In the same manner as in the case of Steps S12 and S13 in the power-on downshift, the control unit 20 first sets the target input rotational speed Nin-targ, and calculates the target rotation change acceleration atarg that is the acceleration of the target input rotational speed Nin-targ by dividing a value obtained by subtracting the input rotational speed NM before the shifting from the input rotational speed Nin after the shifting by the target shift time tch (S32). Then, the control unit 20 multiplies the calculated target rotation change acceleration atarg by the input-related member inertia Iin to calculate the inertia torque Ti that is to be generated based on the rotation change of the input-related members (S33).

In the power-on upshift, as shown in FIG. 9, the input rotational speed Nin, that is, the motor speed Nmg decreases along with the upshifting, reaching a lower speed after the shifting, and thus, based on the performance characteristics of the motor, the maximum motor torque Tmg-max and the minimum motor torque Tmg-min serving as the performance limits of the motor 3 increase in absolute values along with the rotation change. For example, outputting the motor torque Tmg at the minimum motor torque Tmg-min serving as one of the performance limits of the motor 3 in order to generate the inertia torque Ti results in an increase in the motor torque Tmg during the inertia phase.

Therefore, based on the motor speed Nmg after the shifting that can be calculated from the gear ratio Gbe before shifting and the output rotational speed Nout, the control unit 20 sets the set value Tmg-lim to the minimum motor torque Tmg-min before the shifting (at the time t31) (or alternatively at the time 32 before the start of the inertia phase) (i.e., the value having a smaller absolute value between values of the performance limit torque of the motor at the times before and after the shifting) so that the set value Tmg-lim serves as the lower limit value of the motor torque Tmg (S34).

While, in the present embodiment, the set value Tmg-lim is set to the minimum motor torque Tmg-min before the shifting (at the time t31), the motor torque Tmg is obviously prevented from changing during the inertia phase by setting the set value Tmg-lim to a value having an absolute value of this value or less. However, from the viewpoint of generation of the inertia torque Ti, the set value Tmg-lim preferably has as large an absolute value as possible. Therefore, in the present embodiment, the set value Tmg-lim is set to the minimum motor torque Tmg-min before the shifting (at the time t31).

After setting the set value Tmg-lim in this manner, the control unit 20 sets the motor torque Tmg to be actually output to larger one of the set value Tmg-lim and the inertia torque Ti (one that has a smaller absolute value) (when the inertia torque Ti is larger than the set value Tmg-lim, sets the motor torque Tmg to be actually output so that the motor 3 generates all of the inertia torque Ti), and outputs the motor torque Tmg thus set (S35).

Furthermore, after setting the motor torque Tmg, the control unit 20 sets the engine torque Te so as to be reduced by a maximum torque reduction amount (such as 50%) predetermined based on the engine performance, and subsequently sets the engagement-side friction element torque TB to a value obtained by subtracting, from the target torque Ttarg, a smaller one of a value obtained by subtracting the motor torque Tmg and the engine torque Te from the inertia torque Ti and 0 (zero) (as given in a mathematical expression Ttarg{−Min((Ti−Tmg−Te) or 0)}) (when the motor 3 generates all of the inertia torque Ti, sets the share of the engagement-side friction element torque TB to 0 because the engagement-side friction elements need not generate the inertia torque). In other words, the control unit 20 sets the torque to be shared by the engagement-side friction elements to a torque value obtained by adding an amount indicated by an arrow M to a torque value to be transmitted as the driving force to the wheels indicated by a dashed line in FIG. 9; that is, the control unit 20 sets the engagement-side friction element torque TB so as to share the remaining part of the inertia torque, which cannot be generated from the motor torque Tmg and the engine torque Te. Then, the control unit 20 outputs a command such that the engaging pressure of the engagement-side friction elements is adjusted with the hydraulic control device 21 so as to obtain the engagement-side friction element torque TB (S36). Then, the inertia calculation control is terminated (S37).

After the inertia calculation control is terminated as described above, the actual shifting starts at the time t31. First, the release-side friction element torque TA is reduced at a predetermined gradient while the engagement-side friction element torque TB is increased at a predetermined gradient so as to shift the torque share from the release-side friction elements to the engagement-side friction elements (torque phase). Then, so as to supplement the inertia torque Ti of the input-related members with the engine torque Te and the motor torque Tmg, the motor torque Tmg is output at the set value Tmg-lim, and the engine torque Te is reduced as described above. Thus, the motor torque Tmg is output in a stable manner at a constant value without change as indicated by an arrow I, from the time t32 until a time t34 at which feedback control of the motor for the smoothing control (described later) starts.

Accordingly, the input torque Tin obtained by adding the engine torque Te to the motor torque Tmg is output along a value obtained by adding the amount of engine torque reduction and the set value Tmg-lim to the target torque Ttarg. That is, the input torque Tin is controlled in a stable manner without exceeding the limits of the motor performance. The engine torque Te is reduced so as to be substantially constant in a stable manner.

The engagement-side friction elements are controlled so as to share the engagement-side friction element torque TB set as described above (so as to share the inertia torque remaining after the subtraction of the motor torque Tmg and the engine torque Te). Thus, the engagement-side friction element torque TB is controlled so as to follow a constant gradient as indicated by an arrow J from the time t32 until the time t33 at which the feedback control of the friction elements for the smoothing control (described later) starts. Accordingly, the output torque Tout follows a substantially constant gradient as indicated by an arrow K during a period from the time t32 to the time t34, which prevents the driver depressing the accelerator pedal from feeling a sense of reduction in the output torque Tout (sense of deceleration), thus preventing the driver from having the uncomfortable feeling during the shifting.

Furthermore, during the period from the time t32 to the time t34, the motor torque Tmg in the inertia phase during the shifting is limited to the set value Tmg-lim that has been set to or below a value having a smaller absolute value between values of the performance limit torque of the motor (minimum motor torque Tmg-min) at the times before the shifting. This can prevent the motor torque Tmg from being changed by a change in the performance limit torque of the motor (minimum motor torque Tmg-min) during the shifting. Accordingly, the input rotational speed Nin (rotation change of the input-related members) decreases in a stable manner at a constant gradient so as to reach the target input rotational speed Nin-targ as indicated by an arrow L. Therefore, for example, the change in the engine sound and the fluctuation on the tachometer are prevented, thus preventing the driver from having the uncomfortable feeling during the shifting.

[Smoothing Control of Power-On Upshift]

A description will be made on the smoothing control in the power-on upshift. The smoothing control shown in FIG. 4 is also performed in the power-on upshift. Specifically, when the shifting progression ratio reaches the predetermined progression ratio, the control unit 20 starts the smoothing control (S51), and determines whether the feedback control (FB) of the engagement-side friction elements has started or the feedback control (FB) of the motor 3 has started (S52). When the feedback control of either of them has started (Yes at S52), the control unit 20 sets the smoothing torque sharing ratios of the motor torque Tmg and the engagement-side friction element torque TB, and, according to the smoothing torque sharing ratios, sets the respective feedback gains, that is, the feedback gain for the engagement-side friction elements and the feedback gain for the motor 3 so as to distribute the torque shared in the smoothing control (S53).

While the engine torque Te is reduced during the inertia phase in the power-on upshift, the smoothing control is characterized by setting the smoothing torque sharing ratios of the motor torque Tmg and the engagement-side friction element torque TB without including the engine torque Te.

The control unit 20 sets the smoothing torque sharing ratios by calculating the ratio of the maximum motor torque Tmg-max (or the minimum motor torque Tmg-min) to the inertia torque Ti as the smoothing torque sharing ratio of the motor 3, and obtaining the remainder (100%−smoothing torque sharing ratio of motor 3) as the smoothing torque sharing ratio of the engagement-side friction elements.

After the feedback gains for the engagement-side friction elements and the motor 3 are set according to the respective smoothing torque sharing ratios in this manner, the control unit 20 determines whether the shift control has ended (S54), and if the shift control has not ended (No at S54), outputs the feedback gain sharing ratios (S55), that is, performs the feedback control of the engagement-side friction elements and the feedback control of the motor 3 with the respective shared gains. If the control unit 20 determines that the shift control has ended at the time t36 (Yes at S54), the smoothing control is terminated (S56).

In the same manner as has been described above, the response of the motor 3 in the output control thereof is quicker than the hydraulic response of the engagement-side friction elements. Thus, starting the feedback control at the same time may result in a delay in the response of the engagement-side friction elements. Therefore, as shown in FIG. 9, the feedback control of the engagement-side friction elements starts at the time t33 that is a start time obtained based on the time t34 serving as the start time of the feedback control of the motor 3 while taking into account the amount of delay in the response of the engagement-side friction elements and the smoothing torque sharing ratios.

Accordingly, as shown in FIG. 9, reducing the engagement-side friction element torque TB from the time t33 reduces the torque transmitted to the wheel side to start reducing the inertia torque Ti to the input-related members (i.e., reduce the rotation change), and increasing (reducing the absolute value of) the motor torque Tmg (input torque Tin) from the time t34 gradually reduces the inertia torque Ti and finally reduces it to zero. At a time t35, the engagement state is established in which the engagement-side friction element torque TB serves as the torque transmitted to the wheel side, and the inertia phase is substantially finished. Accordingly, the engagement of the engagement-side friction elements is completed (full engagement) by the time t36, and the shift control is terminated at the time t36.

As described above, the smoothing control of the power-on upshift also sets the smoothing torque sharing ratios of the motor 3 and the engagement-side friction elements, and based on the smoothing torque sharing ratios, performs control so as to distribute, to the motor 3 and the engagement-side friction elements, the torque to be shared therebetween in the smoothing control. This can eliminate the necessity of changing the torque of the internal combustion engine 2 in the smoothing control, and thus prevents the fluctuation such as the engine racing or the drop in the input rotational speed Nin that may occur when the smoothing control is performed using the internal combustion engine 2. Setting the smoothing torque sharing ratios of the motor 3 and the friction engagement elements can prevent the motor torque Tmg from being required to exceed the performance limit torque of the motor 3 (the maximum motor torque Tmg-max or the minimum motor torque Tmg-min), and thus implements a good smoothing control that does not require either of the motor 3 and the friction engagement elements to share excessive torque.

Because the smoothing torque sharing ratios are set based on the engagement state of the engagement-side friction elements in the inertia phase, the limit of torque that can be generated by the engagement-side friction elements can be prevented from being exceeded. Thus, a good smoothing control can be implemented.

Because the feedback gains for the motor and the engagement-side friction elements in the feedback control of the smoothing control are set according to the respective smoothing torque sharing ratios, hunting in the feedback control or the like can be prevented to prevent divergence of the control. Thus, a good feedback control can be implemented.

Because the start time of the feedback control of the motor and the start time of the feedback control of the engagement state of the friction engagement elements are set according to the respective smoothing torque sharing ratios, a good feedback control can be implemented in consideration of the motor control whose response is particularly quicker than the hydraulic response of the engagement-side friction elements.

[Shift Control of Power-Off Downshift]

Figure 10:
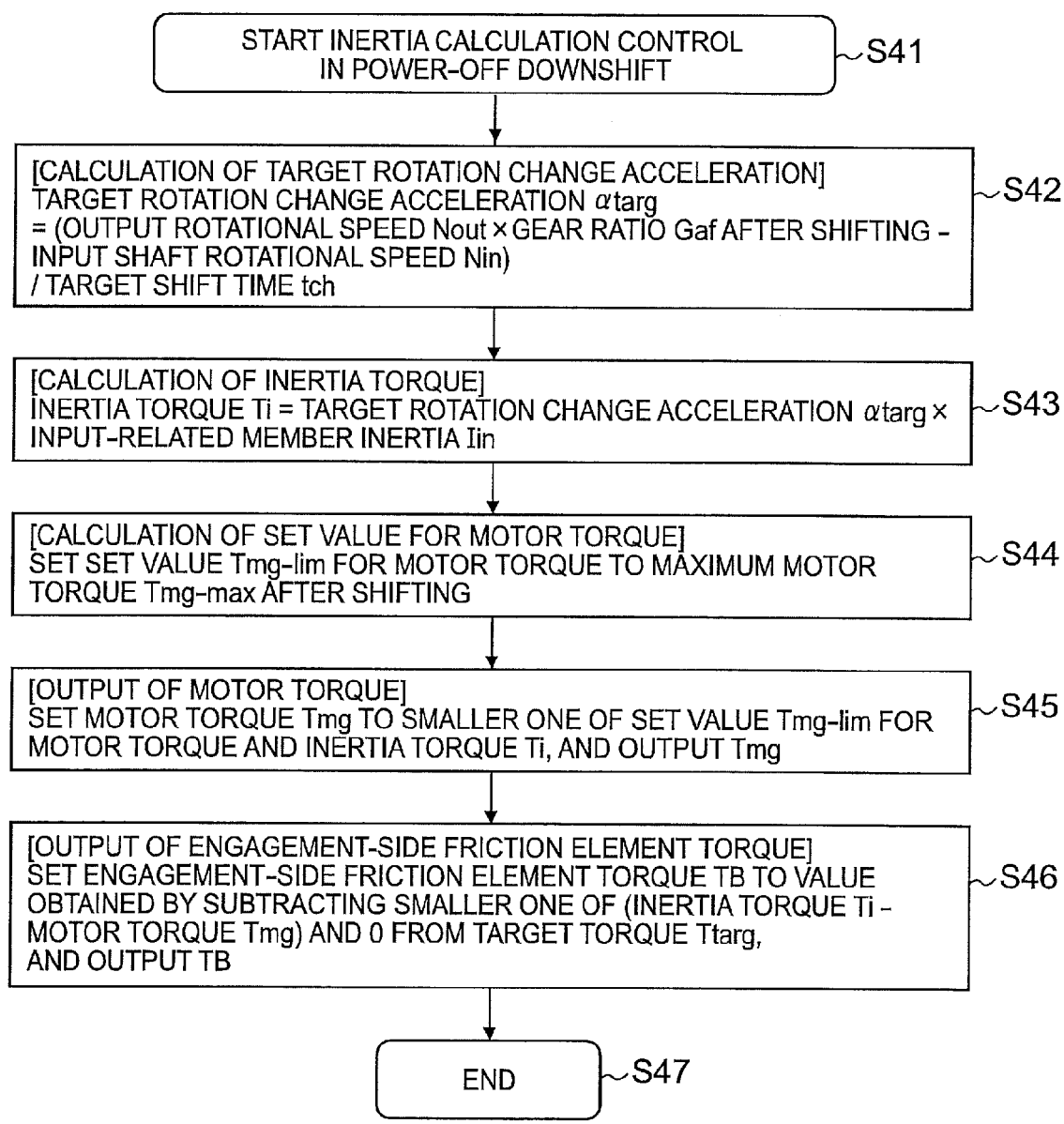
FIG. 10 is a flowchart showing the inertia calculation control during a power-off downshift.
Figure 11:
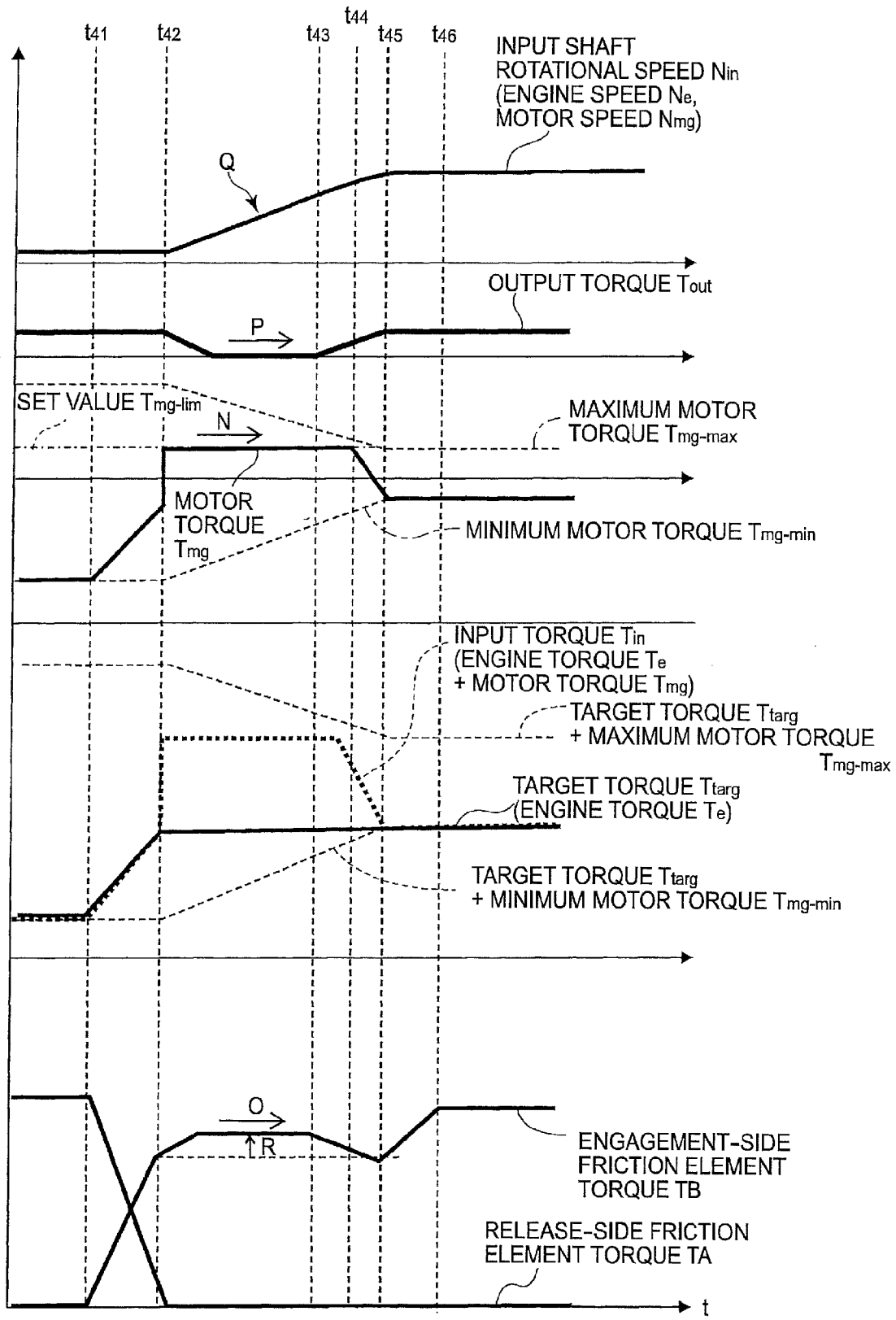
FIG. 11 is a timing chart showing the values during the power-off downshift.

A description will be made on the shift control during the power-off downshift while the vehicle is traveling using mainly the driving force of the internal combustion engine 2, based on FIGS. 10 and 11. In FIG. 11, a period from a time t41 to a time t42 corresponds to the "torque phase" in which the torque shares among the friction elements are switched, and a period from the time t42 to a time t46 in which the input rotational speed Nin changes corresponds to the period of the "inertia phase". In the end period of the shifting from a time t43 to the time t46, the "smoothing control" is performed to moderate the change in inertia torque Ti.

The power-off downshift refers to shifting downward while the accelerator is off, in other words, a state of shifting down during deceleration. In the power-off downshift, the rotational speed of the input shaft 15 (input-related members) increases after the shifting.

During the power-off downshift, the internal combustion engine 2 stops outputting the driving force based on the accelerator-off operation, and thus outputs negative torque to decelerate the rotation of the input-related members. Releasing the release-side friction elements merely decelerates the rotation of the input-related members. Therefore, by tightening the engagement state (increasing the transmitted torque) of the engagement-side friction elements, a larger amount of vehicle inertia torque is transmitted back to the internal combustion engine 2 from the wheel side and acts on the input-related members. This can accelerate the rotation of the input-related members. Accordingly, in the power-off downshift, the control is performed first in the torque phase in which the torque shares are switched between the release-side friction elements and the engagement-side friction elements, and then in the inertia phase in which the rotation change is performed mainly by the engagement control of the engagement-side friction elements.

The use of only the acceleration of the input-related members may impose a large load on the engagement-side friction elements in the inertia phase. Therefore, to reduce the load of the engagement-side friction elements, at least a part of the inertia torque can be generated from the motor torque (positive torque). However, when the motor torque Tmg changes during the inertia phase, the engagement-side friction element torque TB needs to be changed in accordance with the change in the motor torque Tmg. Considering the response of the hydraulic control of the engagement-side friction elements slower than the response of the electric control of the motor 3, the input rotational speed Nin may change in the inertia phase, and this may lead to the uncomfortable feeling of the driver.

Therefore, in the same manner as in the above-described cases of the power-on downshift, the power-off upshift, and the power-on upshift, the control is performed as described below so as to allow the motor torque Tmg to be output in a stable manner with as small a change as possible during the inertia phase in which the motor torque Tmg and the engagement-side friction element torque TB share the inertia torque.

[Inertia Calculation Control of Power-Off Downshift]

A description will be made on the inertia calculation during the power-off downshift, based on FIG. 10, with reference to FIG. 11. When the control unit 20 has determined to perform the power-off downshift based on, for example, the accelerator operation amount and the vehicle speed, the control unit 20 starts the inertia calculation control in the power-off downshift shown in FIG. 10 by the time t41 shown in FIG. 11 (S41).

In the same manner as in the case of Steps S12 and S13 in the power-on downshift, the control unit 20 first sets the target input rotational speed Nin-targ, and calculates the target rotation change acceleration atarg that is the acceleration of the target input rotational speed Nin-targ by dividing a value obtained by subtracting the input rotational speed Nin before the shifting from the input rotational speed Nin after the shifting by the target shift time tch (S42). Then, the control unit 20 multiplies the calculated target rotation change acceleration atarg by the input-related member inertia Iin to calculate the inertia torque Ti that is to be generated based on the rotation change of the input-related members (S43).

In the power-off downshift, as shown in FIG. 11, the input rotational speed Nin, that is, the motor speed Nmg increases along with the downshifting, reaching a higher speed after the shifting, and thus, based on the performance characteristics of the motor, the maximum motor torque Tmg-max and the minimum motor torque Tmg-min serving as the performance limits of the motor 3 decrease in absolute values along with the rotation change. For example, outputting the motor torque Tmg at the maximum motor torque Tmg-max serving as one of the performance limits of the motor 3 in order to generate the inertia torque Ti results in a reduction in the motor torque Tmg during the inertia phase.

Therefore, based on the motor speed Nmg after the shifting that can be calculated from the gear ratio Gbe before shifting and the output rotational speed Nout, the control unit 20 sets the set value Tmg-lim to the maximum motor torque Tmg-max after the shifting (at the time t46) (i.e., the value having a smaller absolute value between values of the performance limit torque of the motor at the times before and after the shifting) so that the set value Tmg-lim serves as the upper limit value of the motor torque Tmg (S44).

While, in the present embodiment, the set value Tmg-lim is set to the maximum motor torque Tmg-max after the shifting (at the time t46), the motor torque Tmg is obviously prevented from changing during the inertia phase by setting the set value Tmg-lim to a value having an absolute value of this value or less. However, from the viewpoint of generation of the inertia torque Ti, the set value Tmg-lim preferably has as large an absolute value as possible. Therefore, in the present embodiment, the set value Tmg-lim is set to the maximum motor torque Tmg-max after the shifting (at the time t46).

After setting the set value Tmg-lim in this manner, the control unit 20 sets the motor torque Tmg to be actually output to smaller one of the set value Tmg-lim and the inertia torque Ti (when the inertia torque Ti is smaller than the set value Tmg-lim, sets the motor torque Tmg to be actually output so that the motor 3 generates all of the inertia torque Ti), and outputs the motor torque Tmg thus set (S45).

Furthermore, after setting the motor torque Tmg, the control unit 20 sets the engagement-side friction element torque TB to a value obtained by subtracting, from the target torque Ttarg, a smaller one of a value obtained by subtracting the motor torque Tmg from the inertia torque Ti and 0 (zero) (as given in the mathematical expression Ttarg{−Min((Ti−Tmg) or 0)}) (when the motor 3 generates all of the inertia torque Ti, sets the share of the engagement-side friction element torque TB to 0 because the engagement-side friction elements need not generate the inertia torque). In other words, the control unit 20 sets the torque to be shared by the engagement-side friction elements to a torque value obtained by adding an amount indicated by an arrow R to a torque value to be transmitted as the driving force to the wheels indicated by a dashed line in FIG. 11; that is, the control unit 20 sets the engagement-side friction element torque TB so as to share the remaining part of the inertia torque, which cannot be generated from the motor torque Tmg. Then, the control unit 20 outputs a command such that the engaging pressure of the engagement-side friction elements is adjusted with the hydraulic control device 21 so as to obtain the engagement-side friction element torque TB (S46). Then, the inertia calculation control is terminated (S47).

After the inertia calculation control is terminated as described above, the actual shifting starts at the time t41. First, the release-side friction element torque TA is reduced at a predetermined gradient while the engagement-side friction element torque TB is increased at a predetermined gradient so as to shift the torque share from the release-side friction elements to the engagement-side friction elements (torque phase). Then, so as to supplement the inertia torque Ti of the input-related members with the motor torque Tmg, the motor torque Tmg is output at the set value Tmg-lim. Thus, the motor torque Tmg is output in a stable manner at a constant value without change as indicated by an arrow N, from the time t42 until a time t44 at which feedback control of the motor for the smoothing control (described later) starts.

Accordingly, the input torque Tin obtained by adding the engine torque Te to the motor torque Tmg is output along a value obtained by adding the amount of engine torque reduction and the set value Tmg-lim to the target torque Ttarg. That is, the input torque Tin is controlled in a stable manner without exceeding the limits of the motor performance.

The engagement-side friction elements are controlled so as to share the engagement-side friction element torque TB set as described above (so as to share the inertia torque remaining after the subtraction of the motor torque Tmg). Thus, the engagement-side friction element torque TB is controlled so as to follow a constant gradient as indicated by an arrow O from the time t42 until the time t43 at which the feedback control of the friction elements for the smoothing control (described later) starts. Accordingly, the output torque Tout follows a substantially constant gradient as indicated by an arrow P during a period from the time t42 to the time t44, and prevents the driver releasing (turning off) the accelerator pedal from feeling a sense of increase in the output torque Tout (sense of acceleration), thus preventing the driver from having the uncomfortable feeling during the shifting.

Furthermore, during the period from the time t42 to the time t44, the motor torque Tmg in the inertia phase during the shifting is limited to the set value Tmg-lim that has been set to or below a value having a smaller absolute value between values of the performance limit torque of the motor (maximum motor torque Tmg-max) at the times before the shifting. This can prevent the motor torque Tmg from being changed by a change in the performance limit torque of the motor (maximum motor torque Tmg-max) during the shifting. Accordingly, the input rotational speed Nin (rotation change of the input-related members) decreases in a stable manner at a constant gradient so as to reach the target input rotational speed Nin-targ as indicated by an arrow Q. Therefore, for example, the change in the engine sound and the fluctuation on the tachometer are prevented, thus preventing the driver from having the uncomfortable feeling during the shifting.

[Smoothing Control of Power-Off Downshift]

A description will be made on the smoothing control in the power-off downshift. The smoothing control shown in FIG. 4 is also performed in the power-off downshift. Specifically, when the shifting progression ratio reaches the predetermined progression ratio, the control unit 20 starts the smoothing control (S51), and determines whether the feedback control (FB) of the engagement-side friction elements has started or the feedback control (FB) of the motor 3 has started (S52). When the feedback control of either of them has started (Yes at S52), the control unit 20 sets the smoothing torque sharing ratios of the motor torque Tmg and the engagement-side friction element torque TB, and, according to the smoothing torque sharing ratios, sets the respective feedback gains, that is, the feedback gain for the engagement-side friction elements and the feedback gain for the motor 3 so as to distribute the torque shared in the smoothing control (S53).

The control unit 20 sets the smoothing torque sharing ratios by calculating the ratio of the maximum motor torque Tmg-max (or the minimum motor torque Tmg-min) to the inertia torque Ti as the smoothing torque sharing ratio of the motor 3, and obtaining the remainder (100%−smoothing torque sharing ratio of motor 3) as the smoothing torque sharing ratio of the engagement-side friction elements.

After the feedback gains for the engagement-side friction elements and the motor 3 are set according to the respective smoothing torque sharing ratios in this manner, the control unit 20 determines whether the shift control has ended (S54), and if the shift control has not ended (No at S54), outputs the feedback gain sharing ratios (S55), that is, performs the feedback control of the engagement-side friction elements and the feedback control of the motor 3 with the respective shared gains. If the control unit 20 determines that the shift control has ended at the time t46 (Yes at S54), the smoothing control is terminated (S56).

In the same manner as has been described above, the response of the motor 3 in the output control thereof is quicker than the hydraulic response of the engagement-side friction elements. Thus, starting the feedback control at the same time may result in a delay in the response of the engagement-side friction elements. Therefore, as shown in FIG. 11, the feedback control of the engagement-side friction elements starts at the time t43 that is a start time obtained based on the time t44 serving as the start time of the feedback control of the motor 3 while taking into account the amount of delay in the response of the engagement-side friction elements and the smoothing torque sharing ratios.

Accordingly, as shown in FIG. 11, reducing the engagement-side friction element torque TB from the time t43 reduces the torque transmitted to the wheel side to start reducing the inertia torque Ti to the input-related members (i.e., reduce the rotation change), and reducing the motor torque Tmg (input torque Tin) from the time t44 gradually reduces the inertia torque Ti and finally reduces it to zero. At a time t45, the engagement state is established in which the engagement-side friction element torque TB serves as the torque transmitted to the wheel side, and the inertia phase is substantially finished. Accordingly, the engagement of the engagement-side friction elements is completed (full engagement) by the time t46, and the shift control is terminated at the time t46.

As described above, the smoothing control of the power-off downshift also sets the smoothing torque sharing ratios of the motor 3 and the engagement-side friction elements, and based on the smoothing torque sharing ratios, performs control so as to distribute, to the motor 3 and the engagement-side friction elements, the torque to be shared therebetween in the smoothing control. This can eliminate the necessity of changing the torque of the internal combustion engine 2 in the smoothing control, and thus prevents the fluctuation such as the engine racing or the drop in the input rotational speed Nin that may occur when the smoothing control is performed using the internal combustion engine 2. Setting the smoothing torque sharing ratios of the motor 3 and the friction engagement elements can prevent the motor torque Tmg from being required to exceed the performance limit torque of the motor 3 (the maximum motor torque Tmg-max or the minimum motor torque Tmg-min), and thus implements a good smoothing control that does not require either of the motor 3 and the friction engagement elements to share excessive torque.

Because the smoothing torque sharing ratios are set based on the engagement state of the engagement-side friction elements in the inertia phase, the limit of torque that can be generated by the engagement-side friction elements can be prevented from being exceeded. Thus, a good smoothing control can be implemented.

Because the feedback gains for the motor and the engagement-side friction elements in the feedback control of the smoothing control are set according to the respective smoothing torque sharing ratios, hunting in the feedback control or the like can be prevented to prevent divergence of the control. Thus, a good feedback control can be implemented.

Because the start time of the feedback control of the motor and the start time of the feedback control of the engagement state of the friction engagement elements are set according to the respective smoothing torque sharing ratios, a good feedback control can be implemented in consideration of the motor control whose response is particularly quicker than the hydraulic response of the engagement-side friction elements.

[Other Possibilities of Hybrid Drive Device]

While the above description has been made on the present embodiment that includes the stepped speed change mechanism 7 that can achieve, for example, six forward speeds and a reverse speed, the present invention may be applied to a stepped speed change mechanism that achieves, for example, three to five forward speeds, or seven or more forward speeds; in other words, the present invention may be applied to any stepped speed change mechanism that performs the shifting by switching the engagement of the friction engagement elements.

While, in the present embodiment, the description has been made on the hybrid drive device 5 in which the motor 3 is directly drivingly coupled to the input shaft 15, the present invention is not limited to this, but may be applied to a hybrid drive device in which the motor is disposed on another parallel shaft and is coupled via a gear mechanism or a chain to the input shaft.

INDUSTRIAL APPLICABILITY

The hybrid drive device according to the present invention can be used in a vehicle such as a passenger car and a truck, and in particular, suitably used in a vehicle that generates at least a part of inertia torque during shifting from motor torque and is desired to prevent occurrence of uncomfortable feeling during shifting.

DESCRIPTION OF THE REFERENCE NUMERALS

2 Internal combustion engine
3 Motor
5 Hybrid drive device
7 Stepped speed change mechanism
15 Input member (input shaft)
20 Control device (control unit)
C-1 Friction engagement element (clutch)
C-2 Friction engagement element (clutch)
C-3 Friction engagement element (clutch)
B-1 Friction engagement element (brake)
B-2 Friction engagement element (brake)

Nin Actual rotational speed of input member (input rotational speed)
Nin-targ Target input rotational speed
Ti Inertia torque
Tmg Motor torque
Tmg-max Performance limit torque of motor (maximum motor torque)
Tmg-min Performance limit torque of motor (minimum motor torque)
Tmg-lim Set value

The invention claimed is:

1. A hybrid drive device comprising:
an input member drivingly coupled to an internal combustion engine;
a motor drivingly coupled to the input member;
a stepped speed change mechanism capable of shifting speed of rotation of the input member by changing an engagement state of friction engagement elements; and
a control device capable of controlling the engagement state of the friction engagement elements at least during the shifting, and capable of performing control so that motor torque output by the motor produces at least a part of inertia torque needed for rotation change of input-related members drivingly coupled to the input member during the shifting, wherein
the control device limits the motor torque in an inertia phase during the shifting to a set value that has been set to or below a value having a smaller absolute value between values of performance limit torque of the motor at times before and after the shifting, sets a target input rotational speed of the input member during the shifting, and controls the engagement state of the friction engagement elements that control the rotation change of the input-related members in the inertia phase so as to generate the inertia torque calculated from the target input rotational speed in the input-related members, and
the control device performs smoothing control to moderate a change in the inertia torque in an end period of the shifting, sets smoothing torque sharing ratios of the motor and the friction engagement elements in the smoothing control, and, based on the smoothing torque sharing ratios, performs control so as to distribute torque to be shared by the motor and the friction engagement elements in the smoothing control to the motor and the friction engagement elements.

2. The hybrid drive device according to claim 1, wherein the control device sets the smoothing torque sharing ratios based on the engagement state of the friction engagement elements that control the rotation change of the input-related members in the inertia phase.

3. The hybrid drive device according to claim 2, wherein, in the smoothing control, the control device controls in a feedback manner the motor and the engagement state of the friction engagement elements based on an actual rotational speed of the input member with respect to the target input rotational speed, and sets a feedback gain for the motor and a feedback gain for the friction engagement elements in the feedback control according to the smoothing torque sharing ratios.

4. The hybrid drive device according to claim 3, wherein the control device sets a start time of the feedback control of the motor and a start time of the feedback control of the engagement state of the friction engagement elements according to the respective smoothing torque sharing ratios.

5. The hybrid drive device according to claim 1, wherein, in the smoothing control, the control device controls in a feedback manner the motor and the engagement state of the friction engagement elements based on an actual rotational speed of the input member with respect to the target input rotational speed, and sets a feedback gain for the motor and a feedback gain for the friction engagement elements in the feedback control according to the smoothing torque sharing ratios.

6. The hybrid drive device according to claim 5, wherein the control device sets a start time of the feedback control of the motor and a start time of the feedback control of the engagement state of the friction engagement elements according to the respective smoothing torque sharing ratios.

* * * * *